United States Patent
Breen et al.

(10) Patent No.: US 7,155,674 B2
(45) Date of Patent: Dec. 26, 2006

(54) ACCESSING TELEVISION SERVICES

(75) Inventors: George Edward Breen, Wyncote, PA (US); Stephen Jay Kraiman, Warrington, PA (US)

(73) Assignee: Seachange International, Inc., Acton, MA (US)

( * ) Notice: Subject to any disclaimer, the term of this patent is extended or adjusted under 35 U.S.C. 154(b) by 327 days.

(21) Appl. No.: 10/137,995

(22) Filed: May 3, 2002

(65) Prior Publication Data

US 2003/0204846 A1 Oct. 30, 2003

Related U.S. Application Data

(60) Provisional application No. 60/376,192, filed on Apr. 29, 2002.

(51) Int. Cl.
*G06F 3/00* (2006.01)
*H04N 5/445* (2006.01)

(52) U.S. Cl. .................. 715/719; 715/721; 715/765; 715/810; 715/835; 715/854

(58) Field of Classification Search ......... 715/716–721, 715/733, 738, 740, 751, 753, 758, 759, 765, 715/810, 835, 846, 853, 854, 866, 962; 348/734; 705/14; 709/217; 725/32–51, 59, 61, 86, 725/87

See application file for complete search history.

(56) References Cited

U.S. PATENT DOCUMENTS

| | | | |
|---|---|---|---|
| 5,574,494 A | * 11/1996 | Marics | 725/37 |
| 5,619,249 A | 4/1997 | Billock et al. | 725/5 |
| 5,621,456 A | 4/1997 | Florin et al. | 348/7 |
| 5,798,785 A | 8/1998 | Hendricks et al. | 725/46 |
| 5,850,218 A | 12/1998 | LaJoie et al. | 345/327 |
| 5,862,339 A | 1/1999 | Bonnaure et al. | 709/227 |
| 5,892,536 A | 4/1999 | Logan et al. | 725/34 |
| 5,940,073 A | 8/1999 | Klosterman et al. | 345/721 |
| 5,961,603 A | 10/1999 | Kunkel et al. | 709/229 |
| 5,978,381 A | 11/1999 | Perlman et al. | 370/432 |
| 5,986,692 A | 11/1999 | Logan et al. | 725/35 |
| 6,005,631 A | 12/1999 | Anderson et al. | 725/53 |
| 6,014,184 A | 1/2000 | Knee et al. | 725/45 |
| 6,049,333 A | * 4/2000 | LaJoie et al. | 715/718 |
| 6,049,539 A | 4/2000 | Lee et al. | 370/355 |
| 6,052,544 A | 4/2000 | Shimizu et al. | 399/55 |
| 6,133,962 A | * 10/2000 | Proehl et al. | 725/44 |
| 6,141,678 A | 10/2000 | Britt | 709/200 |
| 6,160,989 A | 12/2000 | Hendricks et al. | 725/36 |
| 6,177,931 B1 | 1/2001 | Alexander et al. | 345/327 |

(Continued)

OTHER PUBLICATIONS

Matthew D. Miller, "A Scenario for the Deployment of Interactive Multimedia Cable Television Systems in the United States i the 1990's", Apr. 1994, IEEE, vol. 82, No. 4, p. 585–589.*
U.S. Appl. No. 60/323,658, filed Sep. 19, 2001.*
Joseph E. Augenbraun et al., "System and Method for Transmitting Program Guide and Other Information in a Television Distribution System". U.S. Appl. No. 09/770, 678, filed Jan. 29, 2001, pp. 1–20, application pending.

*Primary Examiner*—Lucila X. Bautista
(74) *Attorney, Agent, or Firm*—Proskauer Rose LLP

(57) ABSTRACT

A television system allows viewers to access a number of different groups of television content, or "service aggregates." A portal interface for each group provides a direct means for the viewer to navigate between members of a service aggregate, without necessarily having to accesses a global program guide for the television system. The groups of television content can be formed from various criteria including forming the groups based on business rules.

28 Claims, 47 Drawing Sheets

U.S. PATENT DOCUMENTS

| | | | |
|---|---|---|---|
| 6,181,335 B1 | 1/2001 | Hendricks et al. | 345/723 |
| 6,198,509 B1 | 3/2001 | Dougherty et al. | 348/467 |
| 6,208,335 B1 | 3/2001 | Gordon et al. | 345/721 |
| 6,215,483 B1 | 4/2001 | Zigmond | 725/112 |
| 6,237,022 B1 | 5/2001 | Bruck et al. | 709/201 |
| 6,253,375 B1 | 6/2001 | Gordon et al. | 725/88 |
| 6,256,785 B1 * | 7/2001 | Klappert et al. | 725/136 |
| 6,263,507 B1 | 7/2001 | Ahmad et al. | 725/134 |
| 6,268,856 B1 | 7/2001 | Bruck et al. | 345/733 |
| 6,298,482 B1 * | 10/2001 | Seidman et al. | 725/101 |
| 6,305,017 B1 | 10/2001 | Satterfield | 725/44 |
| 6,308,202 B1 | 10/2001 | Cohn et al. | 709/217 |
| 6,317,780 B1 | 11/2001 | Cohn et al. | 709/217 |
| 6,317,885 B1 * | 11/2001 | Fries | 725/109 |
| 6,338,094 B1 | 1/2002 | Scott et al. | 709/245 |
| 6,359,636 B1 * | 3/2002 | Schindler et al. | 345/846 |
| 6,397,387 B1 | 5/2002 | Rosin et al. | 725/44 |
| 6,418,556 B1 | 7/2002 | Bennington et al. | 725/40 |
| 6,473,903 B1 * | 10/2002 | Balakrishnan et al. | 725/135 |
| 6,481,010 B1 * | 11/2002 | Nishikawa et al. | 725/44 |
| 6,502,241 B1 * | 12/2002 | Kretz et al. | 725/52 |
| 6,515,680 B1 * | 2/2003 | Hendricks et al. | 345/716 |
| 2002/0023271 A1 | 2/2002 | Augenbraun et al. | 725/109 |
| 2002/0112237 A1 * | 8/2002 | Kelts | 725/39 |
| 2003/0084449 A1 * | 5/2003 | Chane | 725/46 |
| 2003/0088878 A1 * | 5/2003 | Rogers et al. | |
| 2003/0233656 A1 * | 12/2003 | Sie et al. | |
| 2004/0226042 A1 * | 11/2004 | Ellis | 725/43 |
| 2005/0193425 A1 * | 9/2005 | Sull et al. | 725/135 |

* cited by examiner

MAIN MENU SELECTION SCRIPT - HOME.XS

This function presents the appropriate menu based upon the currently tunes channel.

VH1 MENUS - DEMO1.XS

```
function main()
{
    var it;

CHANNEL_1 = 250;

START_CHANNEL = tune();

if (START_CHANNEL == CHANNEL_1)
    {
        it = fetchScript("demo1");
        it();
    }
    else {
        it = fetchScript("demo2");
        it();
    }
}
```

FIG. 13a-1

VH1 MENUS - DEMO1.XS
XScript for VH1 Menus

```
function SetArrows(parent)
{
      var it;
      var i;

// hide/show arrows for scrolling

// up arrow
      if (parent.page == 0)
      {
            it = parent.uparrow;
            it.x = (704);
            it.visible = 0;

}
      else
      {
            it = parent.uparrow;
            it.x = (68);
            it.visible = 1;
      }

//down arrow if (parent.num_items -
parent.page*parent.num_buttons <=
parent.num_buttons)
      {
            it = parent.downarrow;
            it.x = (704);
            it.visible = 0;

} else
      {
            it = parent.downarrow;
            it.x = (68);
            it.visible = 1;

}
} function ShowSubMenu(y)
{
      var i;
      var it;
```

FIG. 13b-1

```
        submenu.y = y;

i = 0;
        while (i < submenu.num_buttons)
        {
                it = submenu.child(i);
                it.x = 6;

//decorative lines
                it = it.child();
                it.y = 0;
                it.x = 0;

it = it.next();
                it.y = 1;
                it.x = 0;

it = it.next();
                it.y = 3;
                it.x = 0;

it = it.next();
                it.y = submenu.height - 2;
                it.x = 0;

i = i + 1;
        }

// hide menu arrows
//      it = menu.child(0);
//      it.x = (704);
//      it.visible = 0;

//      it = menu.child((4) + 1);
//      it.x = (704);
//      it.visible = 0;

it = submenu.child(0);
        it.focus();
} function SubMenuBlur()
{
        var it;

if (this.parent() == submenu)
        { submenu.y = (480);

it = menu.linky;
        it.y = (480);
```

FIG. 13b-2

```
            it = menu.child(cur_menu);

while (submenu.num_items > 0)
    {
            deque.pop_bottom();
            submenu.num_items = submenu.num_items
- 1;
    } submenu.page = 0;

SetArrows(menu);

it.focus();

}
} function SubMenu(which)
{
    var i;

var it;

if ((4) > which && which >= 0 )
    {
            cur_menu = which;

// set left arrow to point to sub-menu
            l_arrow.y = (144) + (which - 1)*(40);

it = menu.child(which);
        it = it.child(4);
        alert(it.value);

if (it.value == "Storytellers")
            {
                    deque.push_bottom("Joel,
Billy");
                    deque.push_bottom("Jewel");
                    deque.push_bottom("Idol,
Billy");
                    deque.push_bottom("Henley,
Don");
                    deque.push_bottom("Fogerty,
John");
                    deque.push_bottom("Eurythmics");
                    deque.push_bottom("ELO");
                    deque.push_bottom("Duran
Duran");
                    deque.push_bottom("Doors, The");
                    deque.push_bottom("Def
Leppard");
```

FIG. 13b-3

```
                deque.push_bottom("CSNY");
                deque.push_bottom("Costello, Elvis");
                deque.push_bottom("Brooks, Garth");
                deque.push_bottom("Bowie, David");
                deque.push_bottom("Bon Jovi");
                deque.push_bottom("Best of...");
                deque.push_bottom("Bee Gees");
                deque.push_bottom("Amos, Tori");

submenu.num_items = 18;
        } else if (it.value == "Behind The Music")
        {
                deque.push_bottom("Diamond, Neil");
                deque.push_bottom("Depeche Mode");
                deque.push_bottom("Denver, John");
                deque.push_bottom("Def Leppard");
                deque.push_bottom("Cult, The");
                deque.push_bottom("Crow, Cheryl");
                deque.push_bottom("Crosby, David");
                deque.push_bottom("Creed");
                deque.push_bottom("Chicago");
                deque.push_bottom("Cher");
                deque.push_bottom("Carpenters");
                deque.push_bottom("Bon Jovi");
                deque.push_bottom("Blues Traveler");
                deque.push_bottom("Blind Melon");
                deque.push_bottom("Black Crowes");
                deque.push_bottom("Barenaked Ladies");
                deque.push_bottom("Bad Company");
                deque.push_bottom("Anthrax");
                deque.push_bottom("AC/DC");

submenu.num_items = 19;
        } else if (it.value == "Pop-Up Video")
        {
                deque.push_bottom("Women of Rock");
```

FIG. 13b-4

```
              deque.push_bottom("Teenage
Wasteland");
              deque.push_bottom("Star Power");
              deque.push_bottom("Madonna");
              deque.push_bottom("Jailhouse Rock");
              deque.push_bottom("Boy Bands");
              deque.push_bottom("80's Hair Bands");

submenu.num_items = 7;
        } else
//      if (it.value == "Video Packages")
          {
              deque.push_bottom("Women of Rock");
              deque.push_bottom("Rap");
              deque.push_bottom("R & B");
              deque.push_bottom("Modern Pop");
              deque.push_bottom("Hard Rock");
              deque.push_bottom("Guitar Greats");
              deque.push_bottom("Dance");
              deque.push_bottom("Country Hits");
              deque.push_bottom("Classic Rock");
              deque.push_bottom("Boy Bands");
              deque.push_bottom("90's Metal");
              deque.push_bottom("90's Grunge");
              deque.push_bottom("80's Pop Rock");
              deque.push_bottom("80's Hair Bands");
              deque.push_bottom("80's Alternative");

submenu.num_items = 15;
        } i = 0;
        // update text for sub menu buttons
        while (i < submenu.num_buttons)
        { it = submenu.child(i);
            if (i < submenu.num_items)
            {

// show button
              it.visible = 1;
              it.x = (16);

// draw appropriate text
              it = it.child(4);
              it.value = deque.peek_bottom(i);

```
            else
            {
               // hide button
               it.visible = 0;
               it.x = (704);
            }
            i = i + 1;
         }

// move submenu region into view
         it = menu.child(which);
         ShowSubMenu(it.y-85);

SetArrows(submenu);

}
} function MoveHilite(left, top, width, height)
{
      var it;

hilite.x = left - (3);
      hilite.y = top - (3);
      hilite.width = width + 6;
      hilite.height = height + 6;

//top
      it = hilite.child();
      it.width = hilite.width;

//left
      it = it.next();

it.height = hilite.height - 6;

//bottom
      it = it.next();

it.y = hilite.height - (3);
      it.width = hilite.width;

//right
      it = it.next();
      it.x = hilite.width - (3);
      it.height = hilite.height - 6;

} function ArrowBlur()
{
```

FIG. 13b-6

```
        if (this.parent() == menu)
        {
                this.clut = fetchClut("arrow");
        }
        else if (this.parent() == submenu)
        {
                this.clut = fetchClut("arrow_2");
        }

}
function ArrowFocus()
{
        MoveHilite((704), (480), 0, 0);

if (this.parent() == menu)
        {
                this.clut = fetchClut("arrow_focus");
        }
        else if (this.parent() == submenu)
        {
                this.clut =
fetchClut("arrow_focus_2");
        }

} function ButtonClick()
{
        var it;

if (this.parent() == menu)
        {
                it = menu.linky;
                it.y = this.y + 13;

// show next level of categories
                SubMenu(this.index());
        } else if (this.parent() == submenu)
        {
                document.update();
//              it = fetchScript("video");
                it = fetchScript("vcr");
                it();
        }
} function InitHilite()
{
        var it;
```

FIG. 13b-7

```
            hilite = new_region(document);
            hilite.x = 0;
            hilite.y = 0;
            hilite.width = 1;
            hilite.height = 1;

// top
            it = new_rectangle(hilite);
            it.x = 0;
            it.y = 0;
            it.width = hilite.width;
            it.height = (3);
            it.color = defineColor(0xd3b60cff);

//left
            it = new_rectangle(hilite);
            it.x = 0;
            it.y = (3);
            it.width = (3);
            it.height = hilite.height - 6;
            it.color = defineColor(0xd3b60cff);

// bottom
            it = new_rectangle(hilite);
            it.x = 0;
            it.y = hilite.height - (3);
            it.width = hilite.width;
            it.height = (3);
            it.color = defineColor(0xd3b60cff);

//right
            it = new_rectangle(hilite);
            it.x = hilite.width - (3);
            it.y = (3);
            it.width = (3);
            it.height = hilite.height - 6;
            it.color = defineColor(0xd3b60cff);

} function MoveHilite(left, top, width, height)
{
        var it;

hilite.x = left - (3);
        hilite.y = top - (3);
        hilite.width = width + 6;
        hilite.height = height + 6;

//top
        it = hilite.child();
        it.width = hilite.width;
```

FIG. 13b-8

```
        //left
        it = it.next();

it.height = hilite.height - 6;

//bottom
        it = it.next();

it.y = hilite.height - (3);
        it.width = hilite.width;

//right
        it = it.next();
        it.x = hilite.width - (3);
        it.height = hilite.height - 6;

} function ButtonFocus()
{
        var parent;
        var it;

it = this.child(4);
        it.color = defineColor(0xffffffff);

parent = this.parent();
        MoveHilite(parent.x + this.x, parent.y +
this.y, this.width, this.height);

} function ButtonBlur()
{
        var it;
        it = this.child(4);
        it.color = defineColor(0x000000ff);
} function ButtonDown()
{
        var it;
        var par;
        var num;

par = this.parent();
        num = par.num_buttons;
        alert(num);
        if (this.index() + 1 < num )
        {
                it = this.next();
```

FIG. 13b-9

```
            it.focus();
        } else
        {
            if (this.parent() == menu)
            {
                cancel_bttn.focus();
            }
        }

} function ButtonUp()
{
        var it;
        if (this.index() > 0)
        {
                it = this.prev();
                it.focus();
        }
} function CancelOnUp()
{
        var it;
        var i;
        var next;

i = 0;
        next = menu.child();

while (i < menu.num_buttons)
        {
                it = menu.child(i);
                if (it.visible == 1)
                {
                        next = it;
                }
                i = i + 1;
        } next.focus();

} function OnExit()
{
        exit();
} function PageUp()
{
```

FIG. 13b-10

```
    var parent;
    var i;
    var it;

parent = this.parent();

it = parent.uparrow;
    if (it.visible == 1)
    {
       if (parent == menu)
       {
            menu.page = menu.page - 1;
            i = menu.page*menu.num_buttons;

while (i < menu.page*menu.num_buttons
+ menu.num_buttons)
            { it = parent.child(i -
menu.page*menu.num_buttons);

if (i < menu.num_items)
                    {
                            it.x = (16);
                            it.visible = 1;
                            it = it.child(4);
                            it.value =
deque.peek_top(i);
                    }
                    else
                    {
                            // hide button
                            it.x = (704);
                            it.visible = 0;

}
                    i = i + 1;

}

}
    else if (parent == submenu)
    {
            submenu.page = submenu.page - 1;
            i = submenu.page*submenu.num_buttons ;
            while (i <
submenu.page*submenu.num_buttons +
submenu.num_buttons)
                {
                    it = parent.child(i -
submenu.page*submenu.num_buttons);

if (i < submenu.num_items)
```

FIG. 13b-11

```
                        {
                                it.x = 6;
                                it.visible = 1;
                                it = it.child(4);
                                it.value =
deque.peek_bottom(i);
                        }
                        else
                        {
                                it.x = (704);
                                it.visible = 0;
                        }
                        i = i + 1;

}

}

SetArrows(parent);

it = parent.child(parent.num_buttons - 1);
        it.focus();

}

} function PageDown()
{
    var i;
    var parent;
    var it;

parent = this.parent();

it = parent.downarrow;
    if (it.visible == 1)
    {
      parent.page = parent.page + 1;

if (parent == menu)
      { i = menu.page*menu.num_buttons;
            while (i < menu.page*menu.num_buttons
+ menu.num_buttons)
            {
                    it = parent.child(i -
menu.page*menu.num_buttons);

if (i < menu.num_items)
                    {
                            it.x = (16);
```

FIG. 13b-12

```
                        it.visible = 1;
                        it = it.child(4);
                        it.value =
deque.peek_top(i);
                }
                else
                {
                        it.x = (704);
                        it.visible = 0;
                }
                i = i + 1;

}

}
    else if (parent == submenu)
    { i = submenu.page*submenu.num_buttons;

while (i <
submenu.page*submenu.num_buttons +
submenu.num_buttons)
            {
                it = parent.child(i -
submenu.page*submenu.num_buttons);

if (i < submenu.num_items)
                {
                        it.x = 6;
                        it.visible = 1;
                        it = it.child(4);
                        it.value =
deque.peek_bottom(i);
                }
                else
                {
                        it.x = (704);
                        it.visible = 0;
                }
                i = i + 1;

}

}

SetArrows(parent);

it = parent.child(0);
    it.focus();
}
```

FIG. 13b-13

```
} function SetButtons()
{
      var it;
      var i;
      var num_items;

num_items = 0;

deque.push_top("Ultimate Albums");
      num_items = num_items + 1;
      deque.push_top("100 Greatest");
      num_items = num_items + 1;
      deque.push_top("Fan Club");
      num_items = num_items + 1;
      deque.push_top("Video Packages");
      num_items = num_items + 1;
      deque.push_top("Pop-Up Video");
      num_items = num_items + 1;
      deque.push_top("Storytellers");
      num_items = num_items + 1;
      deque.push_top("Behind The Music");
      num_items = num_items + 1;

menu.num_items = num_items;

i = 0;
      while (i < menu.num_buttons)
      { it = menu.child(i);

if (i < menu.num_items)
          {
            // show button
            it.visible = 1;
            it.x = 0;

// add text
            it = it.child(4);
            it.value = deque.peek_top(i);

} else
          {
            // hide button
            it.visible = 0;
            it.x = (704);

SetArrows(menu);

} function DrawButtons(parent, num_buttons, left,
top, height, width, spc)
{ var index;
        var text;
        var it;
        var textx;

var h1;
        var h2;
        var h3;
        var h4;

parent.num_buttons = num_buttons;

//set stripe heights
        if (parent == menu)
        {
                h1 = 3;
                h2 = 2;
                h3 = 4;
                h4 = 5;
                textx = 20;
        }
        else if (parent == submenu)
        {
                h1 = 1;
                h2 = 2;
                h3 = 2;
                h4 = 2;
                textx = (4);

} index = 0;
        while (index < num_buttons)
        {
                it = new_rectangle(parent);
                it.x = left;
                it.y = top + index*(height + spc);
                it.width = width;
                it.height = height;
                it.color = defineColor(0x92c2efff);
                it.onfocus = ButtonFocus;
                it.onblur = ButtonBlur;
```

FIG. 13b-15

```
            it.ondown = ButtonDown;
            it.onup = ButtonUp;
            it.onclick = ButtonClick;
            it.onpageup = PageUp;
            it.onpagedown = PageDown;
            it.onright = SubMenuBlur;

// top lines
            it =
new_rectangle(parent.child(index));
            it.x = 0;
            it.y = 0;
            it.width = width;
            it.height = h1;
            it.color = defineColor(0xffffffff);

it =
new_rectangle(parent.child(index));
            it.x = 0;
            it.y = h1;
            it.width = width;
            it.height = h2;
            it.color = defineColor(0x000000ff);

it =
new_rectangle(parent.child(index));
            it.x = 0;
            it.y = h1 + h2;
            it.width = width;
            it.height = h3;
            it.color = defineColor(0x31659cff);

// bottom line
            it =
new_rectangle(parent.child(index));
            it.x = 0;
            it.y = height - h4;
            it.width = width;
            it.height = h4;
            it.color = defineColor(0x31659cff);

text = new_text(parent.child(index));
            text.x = textx;
            text.y = (10);
            text.font = fetchFont( "arial11" );
            text.color = defineColor(0x000000ff);
            text.value = "";

index = index + 1;
      }

```
function main()
{
        var it;
        var index;

menu = new_rectangle(document);
        menu.color = defineColor(0x000000ff);
        menu.y = 0;
        menu.x = 524;
        menu.height = (480);
        menu.width = 224;
        menu.page = 0;

// menu buttons

DrawButtons(menu, (4), 0, (144), (28) ,
menu.width, (12)));

// VH1 logo
        it = new_rectangle(document);
        it.x = menu.x;
        it.y = 24;
        it.width = 224;
        it.height = 87;
        it.color = defineColor(0x31639cff);

it = new_image(it);
        it.bitmap = fetchImage("vh1");
        it.clut = fetchClut("vh1");
        it.x = 48;
        it.y = 7;

// seachange logo
        it = new_image(document);
        it.bitmap = fetchImage("sc_logo");
        it.clut = fetchClut("sc_logo");
        it.x = menu.x + 16;
        it.y = 410;

// up arrow
        it = new_image(menu);
        it.x = (68);
        it.y = 125;
        it.bitmap = fetchImage("arrow_u");
        it.clut = fetchClut("arrow");

it.visible = 1;

menu.uparrow = it;

// down arrow
        it = new_image(menu);
```

FIG. 13b-17

```
        it.x = (68);
        it.y = 300;
        it.bitmap = fetchImage("arrow_d");
        it.clut = fetchClut("arrow");

it.visible = 1;

menu.downarrow = it;

// menu left borders it = new_rectangle(menu);
        it.x = 0;
        it.y = 0;
        it.height = (480);
        it.width = 3;
        it.color = defineColor(0x31659cff);

it = new_rectangle(document);
        it..x = menu.x - 2;
        it.y = 0;
        it.height = (480);
        it.width = 2;
        it.color = defineColor(0xffffffff);

// linky to submenu from menu element
(offscreen for now)
        it = new_rectangle(document);
        it.y = (480);
        it.x = menu.x - 8;
        it.width = 12;
        it.height = 5;
        it.color = defineColor(0x92c2efff);

menu.linky = it;

// Exit button cancel_bttn = new_rectangle(document);
        cancel_bttn.x = menu.x;
        cancel_bttn.y = 367;
        cancel_bttn.width = menu.width;
        cancel_bttn.height = 18;
        cancel_bttn.color = defineColor(0x31659cff);
        cancel_bttn.onfocus = ButtonFocus;
        cancel_bttn.onup = CancelOnUp;
        cancel_bttn.onclick = OnExit;
        cancel_bttn.visible = 1;

// text
        it = new_text(cancel_bttn);
        it.x = 40;
```

FIG. 13b-18

```
        it.y = 3;
        it.font = fetchFont( "arial11" );
        it.value = "Exit Menu";
        it.color = defineColor(0xffffffff);

// define region for sub-menu, offscreen
    submenu = new_rectangle(document);
    submenu.x = 356;
    submenu.y = (480);   //offscreen
    submenu.color = defineColor(0x000000ff);
    submenu.width = 160;
    submenu.height = 201;
    submenu.page = 0;

DrawButtons(submenu, 5, 6, 23, 26, (148),
6);

// up arrow
    it = new_image(submenu);
    it.x = (68);
    it.y = 5;
    it.bitmap = fetchImage("arrow_u");
    it.clut = fetchClut("arrow");

submenu.uparrow = it;

// submenu border it = new_rectangle(submenu);
    it.x = 0;
    it.y = 0;
    it.width = submenu.width;
    it.height = (3);
    it.color = defineColor(0x92c2efff);

it = new_rectangle(submenu);
    it.x = 0;
    it.y = (3);
    it.width = (3);
    it.height = submenu.height - 6;
    it.color = defineColor(0x92c2efff);

it = new_rectangle(submenu);
    it.x = 0;
    it.y = submenu.height - (3);
    it.width = submenu.width;
```

FIG. 13b-19

```
it.height = (3);
it.color = defineColor(0x92c2efff);

it = new_rectangle(submenu);
it.x = submenu.width - (3);
it.y = (3);
it.width = (3);
it.height = submenu.height - 6;
it.color = defineColor(0x92c2efff);

// down arrow
it = new_image(submenu);
it.x = (68);
it.y = 182;
it.bitmap = fetchImage("arrow_d");
it.clut = fetchClut("arrow");

submenu.downarrow = it;

InitHilite();

SetButtons();

it = menu.child(0);
it.focus();

GAMESHOW NETWORK MENUS - DEMO2.XS
XScript for Game Show Network Menus

```
function PlayVideo()
{
        it = fetchScript("vcr");
        it();
} function TextFocus()
{
        this.color = defineColor(0x000000ff);
        hilite.x = this.x - 5;
} function TextBlur()
{
        this.color = defineColor(0x4a7dd6ff);
} function ButtonFocus()
{
        var it;

this.color = defineColor(0xffde4fff);

it = this.child();
        it.color = defineColor(0xffffffff);

it = it.next();
        it.color = defineColor(0xf7b600ff);

it = it.next();
        it.color = defineColor(0xbd8a00ff);

it = it.next();
        it.color = defineColor(0xffffffff);

//      it = it.next();
//      it.color = defineColor(0xffffffff);

it = it.next();
        it.color = defineColor(0xf7b600ff);

it = it.next();
        it.color = defineColor(0xbd8a00ff);
} function ButtonBlur()
{
        var it;
```

FIG. 13c-1

```
            this.color = defineColor(0xa3a3a3ff);

it = this.child();
            it.color = defineColor(0xffffffff);

it = it.next();
            it.color = defineColor(0x858585ff);

it = it.next();
            it.color = defineColor(0x000000ff);

it = it.next();
            it.color = defineColor(0xa3a3a3ff);

//          it = it.next();
//          it.color = defineColor(0xffffffff);

it = it.next();
            it.color = defineColor(0x858585ff);

it = it.next();
            it.color = defineColor(0x000000ff);

} function ButtonUp()
{
        var it;
        it = this.prev();
        it.focus();
} function ButtonDown()
{
        var it;
        it = this.next();
        it.focus();
} function SetArrows()
{
        var it;

if (submenu.page == 0)
        {
                it = submenu.leftarrow;
                it.visible = 0;
                it.y = (480);
        }
        else
        {
                it = submenu.leftarrow;
                it.y = (22);
                it.visible = 1;
```

FIG. 13c-2

```
        } if ((submenu.page + 1)*3 <
submenu.num_items)
        {
                it = submenu.rightarrow;
                it.y = (22);
                it.visible = 1;

}
        else
        {
                it = submenu.rightarrow;
                it.y = (480);
                it.visible = 0;
        }

} function ButtonClick()
{
        var it;
        var i;

last = this.index();

// show submenu it = this.child(6);
                if (it.value == "Game Show Classics")
                {
                        deque.push_top("$25,000
Pyramid");
                        deque.push_top("$100,000
Pyramid");

deque.push_top("Body Language");
                        deque.push_top("Card Sharks");
                        deque.push_top("Family Feud");
                        deque.push_top("Greed");
                        deque.push_top("Hollywood
Squares");
                        deque.push_top("I've Got A
Secret");

deque.push_top("Jeopardy");
                        deque.push_top("Joker's Wild");
                        deque.push_top("Let's Make A
Deal");

deque.push_top("Match Game");
                        deque.push_top("Newlywed Game");
                        deque.push_top("Password");
                        deque.push_top("Press Your
Luck");
                        deque.push_top("Rock & Roll
Jeopardy");
```

FIG. 13c-3

```
                submenu.num_items = 16;

} else if (it.value == "Game Show
Network Originals")
        {
                deque.push_top("Three's A
Crowd");
                deque.push_top("Black & White");
                deque.push_top("Hollywood
Showdown");
                deque.push_top("Poker Face");
                deque.push_top("Interactive
Greed");

submenu.num_items = 5;
        } else if (it.value == "European Game
Shows")
        {
                deque.push_top("Big Brother");
                deque.push_top("Countdown");
                deque.push_top("Crystal Maze");
                deque.push_top("15 to One");
                deque.push_top("Knightmare");
                deque.push_top("Mastermind");
                deque.push_top("Number One");
                deque.push_top("Robot Wars");
                deque.push_top("Shooting
Stars");
                deque.push_top("Survivor");
                deque.push_top("University
Challenge");
                deque.push_top("Weakest Link");

submenu.num_items = 12;
        } else if (it.value == "Interactive
Games")
        {
                deque.push_top("Greed");
                deque.push_top("Number One");
                deque.push_top("Hollywood
Showdown");
                deque.push_top("Poker Face");

submenu.num_items = 4;
        } submenu.page = 0;
        i = 0;
```

FIG. 13c-4

```
            while (i < 3)
            {
                it = submenu.child(6 + i);
                if (i < submenu.num_items)
                { it.value = deque.peek_bottom(i);
                }
                else
                {
                    it.value = "";
                } i = i + 1;

} it = submenu.child(6);
            it.focus();

SetArrows();

submenu.y = 390;
} function MenuBlur()
{
    var it;

} function ScrollRight()
{
    var it;
    var i;

it = submenu.rightarrow;
    if (it.visible == 1)
    {
        submenu.page = submenu.page + 1;
        i = 0;
        while (i < 3)
        { it = submenu.child(6 + i);
            if ((submenu.page*3 + i) <
submenu.num_items)
            { it.value =
deque.peek_bottom(submenu.page*3 + i);
```

```
                    }
                    else
                    {
                       it.value = "";
                    }
                    i = i + 1;
              }
              SetArrows();

it = submenu.child(6);
              it.focus();
        }
} function ScrollLeft()
{
        var it;
        var i;

it = submenu.leftarrow;
        if (it.visible == 1)
        {
              submenu.page = submenu.page - 1;
              i = 0;
              while (i < 3)
              {
                    it = submenu.child(6 + i);
                    if (submenu.page*3 + 1 <
submenu.num_items)
                    {
                       it.value =
deque.peek_bottom(submenu.page*3 + i);
                    }
                    else
                    {
                       it.value = "";
                    }
                    i = i + 1;

SetArrows();

it = submenu.child(7);
              it.focus();

}

}
function SubMenuBlur()
{
        var it;
        var i;

```
        while (i < submenu.num_items)
        {
                deque.pop_bottom();
                i = i + 1;
        } submenu.y = (480);
        it = menu.child(last);
        it.focus();
} function SetButtons()
{
        var it;

it = menu.child(0);
        it = it.child(6);
        it.value = "Game Show Network Originals";

it = menu.child(1);
        it = it.child(6);
        it.value = "Game Show Classics";

it = menu.child(2);
        it = it.child(6);
        it.value = "European Game Shows";

it = menu.child(3);
        it = it.child(6);
        it.value = "Interactive Games";

} function OnExit()
{
        exit();
} function main()
{
        var it;
        var i;

// left menu bar
        menu = new_rectangle(document);
        menu.x = (32);
        menu.y = 0;
        menu.width = 192;
        menu.height = (452);
        menu.color = defineColor(0x4a7dd6ff);

// right border
```

FIG. 13c-7

```
it = new_rectangle(document);
it.x = (32) + menu.width;
it.y = 0;
it.width = 4;
it.height = (452);
it.color = defineColor(0xf7b600ff);

// game show logo
it = new_image(document);
it.x = 64;
it.y = 24;
it.bitmap = fetchImage("gamesh_icon");
it.clut = fetchClut("gamesh_icon");

// menu buttons
i = 0;
while (i < 4)
{
        it = new_rectangle(menu);
        it.x = 0;
        it.y = (120) + i*(54);
        it.width = menu.width;
        it.height = (50);
        it.color = defineColor(0xa3a3a3ff);
        it.onfocus = ButtonFocus;
        it.onblur = ButtonBlur;
        it.onclick = ButtonClick;
        it.ondown = ButtonDown;
        it.onup = ButtonUp;
        it.onright = ButtonClick;

it = new_rectangle(menu.child(i));
        it.x = 0;
        it.y = 0;
        it.width = menu.width;
        it.height = 2;
        it.color = defineColor(0xffffffff);

it = new_rectangle(menu.child(i));
        it.x = 0;
        it.y = 2;
        it.width = menu.width;
        it.height = 3;
        it.color = defineColor(0x858585ff);

it = new_rectangle(menu.child(i));
        it.x = 0;
        it.y = 5;
        it.width = menu.width;
        it.height = 2;
        it.color = defineColor(0x000000ff);
```

FIG. 13c-8

```
                it = new_rectangle(menu.child(i));
                it.x = 0;
                it.y = 7;
                it.width = menu.width;
                it.height = 5;
                it.color = defineColor(0xa3a3a3ff);

//              it = new_rectangle(menu.child(i));
//              it.x = 0;
//              it.y = 41;
//              it.width = menu.width;
//              it.height = 1;
//              it.color = defineColor(0xffffffff);

it = new_rectangle(menu.child(i));
                it.x = 0;
                it.y = 42;
                it.width = menu.width;
                it.height = 5;
                it.color = defineColor(0x858585ff);

it = new_rectangle(menu.child(i));
                it.x = 0;
                it.y = 47;
                it.width = menu.width;
                it.height = 3;
                it.color = defineColor(0x000000ff);

// text
                it = new_text(menu.child(i));
                it.x = (16);
                it.y = (11);
                it.font = fetchFont( "arial11" );
                it.color = defineColor(0x000000ff);
                it.value = "";
                it.width = 152;

i = i + 1;

}

//exit button
        it = new_rectangle(menu);
        it.x = 0;
        it.y = 351;
        it.width = menu.width;
        it.height = (50) - 20;
        it.color = defineColor(0xa3a3a3ff);
        it.onfocus = ButtonFocus;
        it.onblur = ButtonBlur;
        it.onclick = OnExit;
        it.onup = ButtonUp;
        it.onright = ButtonRight;
```

FIG. 13c-9

```
        it = new_rectangle(menu.child(4));
        it.x = 0;
        it.y = 0;
        it.width = menu.width;
        it.height = 2;
        it.color = defineColor(0xffffffff);

it = new_rectangle(menu.child(4));
        it.x = 0;
        it.y = 2;
        it.width = menu.width;
        it.height = 2;
        it.color = defineColor(0x858585ff);

it = new_rectangle(menu.child(4));
        it.x = 0;
        it.y = 4;
        it.width = menu.width;
        it.height = 1;
        it.color = defineColor(0x000000ff);

it = new_rectangle(menu.child(4));
        it.x = 0;
        it.y = 5;
        it.width = menu.width;
        it.height = 5;
        it.color = defineColor(0xa3a3a3ff);

//      it = new_rectangle(menu.child(4));
//      it.x = 0;
//      it.y = 24;
//      it.height = 1;
//      it.width = menu.width;
//      it.color = defineColor(0xffffffff);

it = new_rectangle(menu.child(4));
        it.x = 0;
        it.y = 25;
        it.width = menu.width;
        it.height = 3;
        it.color = defineColor(0x858585ff);

it = new_rectangle(menu.child(4));
        it.x = 0;
        it.y = 28;
        it.width = menu.width;
        it.height = 2;
        it.color = defineColor(0x000000ff);

// text
        it = new_text(menu.child(4));
        it.x = 56;
        it.y = 8;
        it.font = fetchFont( "arial11" );
        it.color = defineColor(0x000000ff);
```

FIG. 13c-10

```
            it.value = "Exit";

//Seachange logo
     it = new_image(document);
     it.x = 64;
     it.y = 408;
     it.bitmap = fetchImage("sc_logo2");
     it.clut = fetchClut("sc_logo2");

//bottom menu bar
     submenu = new_rectangle(document);
     submenu.x = 36 + menu.width;
     submenu.y = (480);
     submenu.height = 60;
     submenu.width = (704) - submenu.x;
     submenu.color = defineColor(0xffde4fff);

it = new_rectangle(submenu);
     it.x = 0;
     it.y = 0;
     it.width = submenu.width;
     it.height = 2;
     it.color = defineColor(0xffffffff);

it = new_rectangle(submenu);
     it.x = 0;
     it.y = 2;
     it.width = submenu.width;
     it.height = 3;
     it.color = defineColor(0xf7b600ff);

it = new_rectangle(submenu);
     it.x = 0;
     it.y = 5;
     it.width = submenu.width;
     it.height = 2;
     it.color = defineColor(0xbd8a00ff);

it = new_rectangle(submenu);
     it.x = 0;
     it.y = 7;
     it.width = submenu.width;
     it.height = 5;
     it.color = defineColor(0xffffffff);

//   it = new_rectangle(submenu);
//   it.x = 0;
//   it.y = submenu.height - 9;
//   it.width = submenu.width;
//   it.height = 1;
```

FIG. 13c-11

```
//      it.color = defineColor(0xffffffff);

it = new_rectangle(submenu);
        it.x = 0;
        it.y = submenu.height - 8;
        it.width = submenu.width;
        it.height = 5;
        it.color = defineColor(0xf7b600ff);

it = new_rectangle(submenu);
        it.x = 0;
        it.y = submenu.height - 3;
        it.width = submenu.width;
        it.height = 3;
        it.color = defineColor(0xbd8a00ff);

// text buttons
        it = new_text(submenu);
        it.x = 44;
        it.y = 15;
        it.font = fetchFont( "arial11" );
        it.color = defineColor(0x4a7dd6ff);
        it.value = "";
        it.width = 104;
        it.onfocus = TextFocus;
        it.onblur = TextBlur;
        it.onright = ButtonDown;
        it.onleft = ScrollLeft;
        it.onup = SubMenuBlur;
        it.onclick = PlayVideo;

it = new_text(submenu);
        it.x = 164;
        it.y = 15;
        it.font = fetchFont( "arial11" );
        it.color = defineColor(0x4a7dd6ff);
        it.value = "";
        it.width = 104;
        it.onfocus = TextFocus;
        it.onblur = TextBlur;
        it.onright = ButtonDown;
        it.onleft = ButtonUp;
        it.onup = SubMenuBlur;
        it.onclick = PlayVideo;

it = new_text(submenu);
        it.x = 284;
        it.y = 15;
        it.font = fetchFont( "arial11" );
        it.color = defineColor(0x4a7dd6ff);
        it.value = "";
        it.width = 104;
        it.onfocus = TextFocus;
        it.onblur = TextBlur;
        it.onleft = ButtonUp;
```

FIG. 13c-12

```
            it.onup = SubMenuBlur;
            it.onclick = PlayVideo;
            it.onright = ScrollRight;

// hilite box
            hilite = new_region(submenu);
            hilite.x = 40;
            hilite.y = 7;
            hilite.width = 108;
            hilite.height = 44;

//top
            it = new_rectangle(hilite);
            it.x = 0;
            it.y = 0;
            it.width = hilite.width;
            it.height = (3);
            it.color = defineColor(0xbd8a00ff);

//left
            it = new_rectangle(hilite);
            it.x = 0;
            it.y = (3);
            it.width = (3);
            it.height = hilite.height - 6;
            it.color = defineColor(0xbd8a00ff);

//bottom
            it = new_rectangle(hilite);
            it.x = 0;
            it.y = hilite.height - (3);
            it.width = hilite.width;
            it.height = (3);
            it.color = defineColor(0xbd8a00ff);

//right
            it = new_rectangle(hilite);
            it.x = hilite.width - (3);
            it.y = (3);
            it.width = (3);
            it.height = hilite.height - 6;
            it.color = defineColor(0xbd8a00ff);

// arrows for scrolling
            it = new_image(submenu);
            it.bitmap = fetchImage("arrow_l");
            it.clut = fetchClut("arrow3");
            it.x = (3);
            it.y = (480);
            it.visible = 0;

submenu.leftarrow = it;

it = new_image(submenu);
            it.bitmap = fetchImage("arrow_r");
```

FIG. 13c-13

```
it.clut = fetchClut("arrow3");
it.x = 400;
it.y = (480);
it.visible = 0;

submenu.rightarrow = it;

SetButtons();

it = menu.child(0);
it.focus();
}
```

FIG. 13c-14

ACCESSING TELEVISION SERVICES

CROSS REFERENCE TO RELATED APPLICATION

This application claims the benefit of U.S. Provisional Application No. 60/376,192 filed Apr. 29, 2002, titled "Accessing Television Services".

TECHNICAL FIELD

This application relates to accessing television services.

BACKGROUND

Television systems today provide viewers with hundreds of channels for viewing. To provide access to the programming of these channels, cable and satellite television systems typically provide an Electronic Program Guide (EPG) that presents a menu-based Graphical User Interface (GUI) for viewers to scan the broadcasting schedule for all of the available channels or to group all programs listed in broadcasting schedule into categories. In systems that provide Video-on-Demand (VOD) programming the EPG typically also allows viewers to select programs to watch on demand. The EPG interface is typically arranged hierarchically, for example, allowing a viewer to select menus of groups of programming, such as groups by genre (e.g., children's programming) or groups by type of programming (e.g., VOD).

SUMMARY

In a general aspect, the invention provides an approach for viewers of a television system to access groups of television services. A number of different groups, or "service aggregates," can be available to a viewer at one time. A portal interface for each group provides a direct means for the viewer to navigate between the member services of an aggregate, without necessarily having to accesses a global program guide for the television system.

In one aspect, in general, the invention features a method for providing access to television content. The method includes forming one or more groups of television content. For each of the groups, a graphical interface is provided for navigating among items of television content of the group. When presenting any of multiple, but not necessarily all, members of a group to a viewer, a graphical representation of other members of the group is displayed to the viewer. In response to a selection of one of the other members by the viewer, the selected member is presented.

In another aspect, in general, the invention features a method for providing access to television content. A first entity forms a group of television content. Each of the members of the television content group correspond to a content provider. Each content provider has a commercial relationship with the first entity. The method includes providing a graphical interface to the viewer, including presenting a graphical representation of the group of television content, and accepting a selection of one of the group from the viewer.

In another aspect, in general, the invention features a method for providing a viewer access to members of a group of associated multimedia content. A data representation of the group of associated multimedia content available to the viewer is formed. When presenting a first member of the group to the viewer, a graphical representation of one or more of the members of the group is displayed according to the data representation of the group. A selection from the viewer of one of the members of the group is accepted; and the selected member of the group is presented to the viewer.

The approach can include one or more of the following features:

The television content that forms a group can include a television broadcast, a video-on-demand program, a subscription program, a subscription-on-demand program, an advertisement (including "info-mercials" and television-based sales), or another group of television content. The television content that forms a group can include forming the group according to a business rule.

The graphical representation displayed can include a selection menu. The graphical representation can be displayed while concurrently presenting a first member of the group. The graphical representation can be displayed without concurrently presenting a first member of the group.

When presenting the member, a request can be accepted from the viewer and the graphical representation of the members can be displayed in response to the viewer's request. The request can be generated by the viewer pressing a single button on a remote control.

The graphical interfaces for different groups can have different types of graphical representations for members of the group.

The graphical representation of other group members can vary based on time. The graphical representation of other group members can vary based on viewer demographics.

The first entity can be a television system operator. The first entity can be a third party. The first entity can be a content provider.

The associated multimedia content available to the viewer can form a group. The group of associated multimedia content can include a television broadcast program, a video-on-demand program, or an advertisement (including "info-mercials" and television-based sales). The advertisement can be based on viewer characteristics. The advertisement can be based on viewer demographics. The group of associated multimedia content can include an internet site. The group of associated multimedia content can include multi-user interactive content.

To display the graphical representation a script can be received and executed.

The approach may have one or more of the following advantages:

Viewers using an interactive interface for a service aggregate may be more likely to remain within the group of services that form the aggregate. This has the advantage that viewers remain focused on the programming content rather than leaving the service aggregate.

The service aggregate can provide navigation interfaces for niche markets, without adding complexity to a global program guide.

A television system operator can define service aggregates that provide a way for delivering local or customized advertising to viewers without modifying the television content that is selected by the viewer.

Scripts may be downloaded from the cable head-end by the set-top box to provide interfaces to the service aggregate. These scripts may also be created at the cable head-end or provided by other parties such as content providers.

Various types of services may be contained in a service aggregate. For example, a service member can be a broadcast channel, on-demand content, an advertisement, or the service may itself be another service aggregate.

Business rules can be used to organize access to programming so that a viewer's interest is driven to targeted advertising or other types of services or service aggregates. Once a viewer has selected a program for viewing, the viewer has implicitly identified themselves as a target for a particular service (e.g., advertisement) related to the program being viewed. Thus, business rules, and not necessarily program genre, can govern which services are accessible to the viewer and control delivery of these appropriate services.

DESCRIPTION OF DRAWINGS

FIGS. 13(a)–(c) illustrate menu scripts.

Like reference symbols in the various drawings indicate like elements.

DESCRIPTION

1 System Overview

A television system provides viewers with access to a variety of television services. For example, a viewer can access particular television channels that are provided by the television system. In addition, the television system provides viewers with access to a number of service aggregates, also referred to as portals, each of which includes a group of television services. These groups of television services can include a number of broadcast television channels, prior (recorded) television programming, video-on-demand programming, targeted advertisements, etc. Associated with each service aggregate is a user interface that allows a viewer to navigate among the various members of the service aggregate when viewing an originally selected program. Each interface for a service aggregate may be unique without necessarily sharing characteristics with interfaces for other service aggregates.

A viewer enters a service aggregate by tuning to a particular channel that is a member of the service aggregate. Alternatively, the viewer enters an aggregate by explicitly "tuning" to a service aggregate for example, by tuning to a predetermined channel or using an EPG or other similar program guide.

After accessing the service aggregate, the viewer can choose to view that aggregate by entering a command on a remote control used for controlling the set-top box. In one example, a dedicated "MENU" key on the remote control is used to access the interface. The interface can optionally be displayed on the entire television screen, on a portion of the screen overlaying the currently viewed program (e.g., picture-in-picture), or in a non-overlaying portion of the screen while a scaled version of the currently viewed program is viewable on the remaining portion of the screen.

Figure 1:
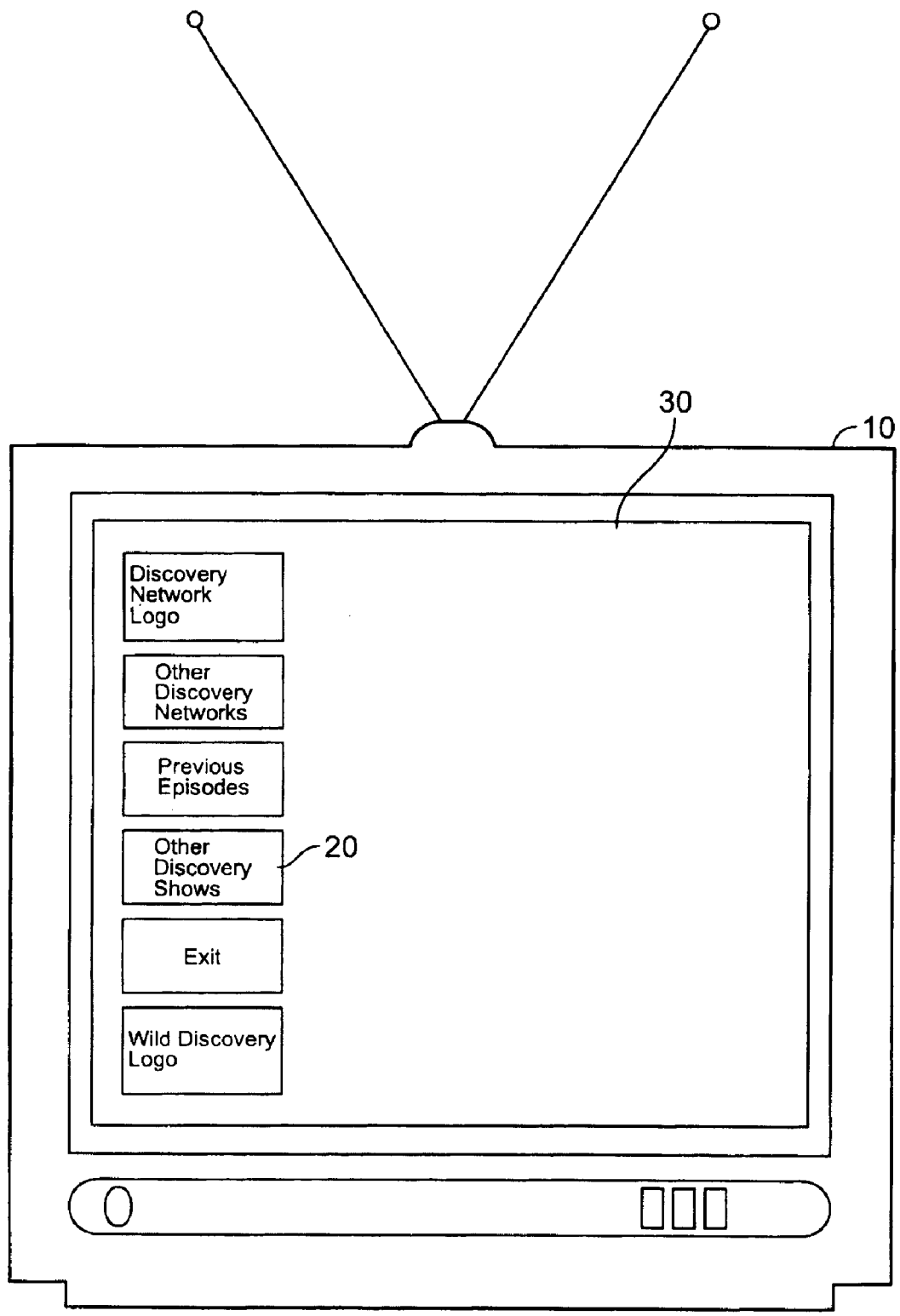
FIG. 1 illustrates a television displaying a menu.

Referring to FIG. 1, a television 10 displays a menu 20 as an interface for a service aggregate entered by the viewer. As described further below, a service aggregate may be formed by any of a number of different parties, including content provides, television system operators, and/or other third parties. The menu 20, along with the service aggregate, may vary dependent upon the channel, affiliation with the channel, or the program being viewed on the television. By tailoring the menu to the program currently viewed on the television, a viewer is provided with a pre-selected group of services from which to choose. By pre-selecting the services, the viewer may be predisposed to remain within the service aggregate and navigate among the services of that service aggregate. Thus, the aggregate provides a way for providers of television content to organize specific content as an aggregate and focus the viewers attention on the items contained in the aggregate.

Figure 2:
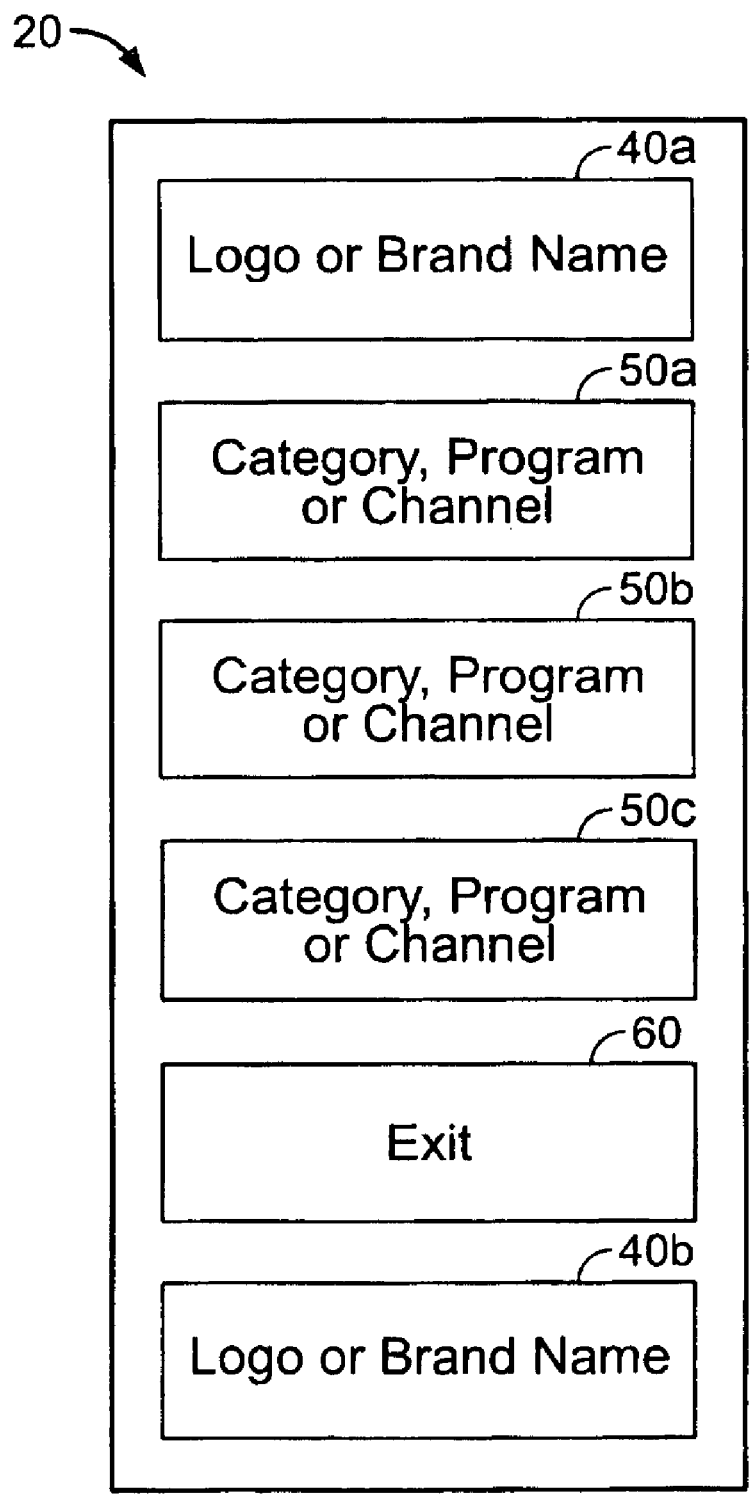
FIG. 2 illustrates an example of a television menu layout.

Referring to FIG. 2 a schematic representation for a typical menu 20 displays the graphical layout of a service aggregate. In this example, top and bottom regions 40a, 40b of the menu 20 contain a company logo or other brand information. Central regions 50a–c may contain buttons that refer, for example, to an individual program, broadcast channel, or another service aggregate related to the company of the displayed logo and/or brand name 40a, 40b. After activating the menu 20, the viewer selects one of the buttons 50a–c in order to view one of the labeled services 50a–c or the viewer may select an exit button 60 to deactivate the menu 20. Services 50a–c may include a broadcast channel related to the currently viewed program or channel, or an on-demand program again related to the currently viewed program or channel, or a web site, a video game, an advertisement, or another service aggregate.

Figure 3:
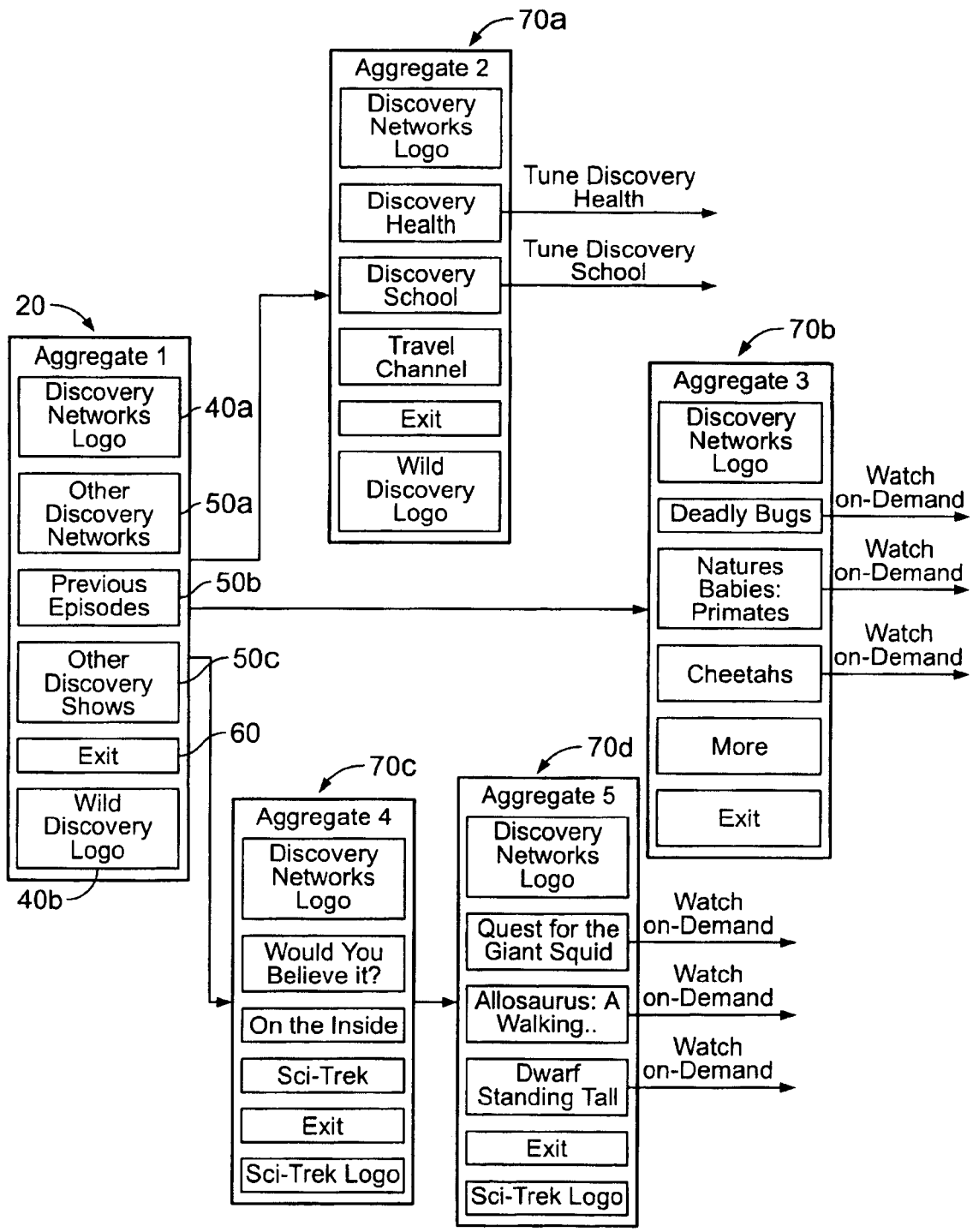
FIG. 3 illustrates an example of a television menu and submenu layout.

Referring to FIG. 3, by selecting among the various services 50a–c, the viewer can navigate into sub-menus 70a–c. For example, if the viewer accesses a menu from a how-to repair show, the viewer can drill down, and further qualify his interests, to a show on re-caulking a bathtub. After navigating through sub-menus the viewer can select another channel to view a related show or select an on-demand video for viewing. The viewer can also return to a parent menu by selecting the exit button 60 on the various menus.

By tailoring the menu for a particular channel a viewer will tend to navigate within the service aggregate associated with the selected channel. For example, referring still to FIG. 3, an example is a service aggregate created by the content provider of various programming offered by the Discovery Network. If a viewer activates the menu 20, while viewing the "Wild Disovery" channel, which is one channel in the Discovery service aggregate, a group of services relating to the "Wild Discovery" channel are displayed. As the viewer navigates throughout the submenus, services which may be accessed by the viewer are pre-selected by the creator of the aggregate, here the content provider. Also, since this service aggregate, menu, and sub-menus were predetermined by the content provider, the viewer is not necessarily aware that his service navigation has been restricted to content provided by the Discovery Network.

While the menus and sub-menus control the content through which the viewer may navigate, the viewer can optionally exit the service aggregate. For example, if the viewer tunes to a different television channel, the viewer may exit one service aggregate and may enter a completely different service aggregate associated with the newly selected channel. Referring briefly back to FIG. 1-3, if while viewing the Wild Discovery channel the viewer tunes the television to the Home Improvement channel, and activates the menu button, the displayed menus and submenus are associated with a service aggregate relating to the Home Network rather than the Discovery Network. Alternatively, exiting an aggregate may not lead to another aggregate but may allow the user simply to navigate through channels in a more conventional way.

2 Service Aggregates

Within the framework described above, various grouping techniques can be used to form the service aggregates. For example, a service aggregate can be formed of programs associated with a particular television network. A service aggregate may be also be formed of programs within a particular genre, for example, game shows or children's programs.

Another basis for grouping content to form a service aggregate is according to business rules. For example, the service aggregate can include the broadcast channels owned by a particular business entity. For instance, all of the channels owned by Discovery Communications, Inc (e.g., Discovery Health, Wild Discovery, etc.) may be members of, and accessed as a single service aggregate with a unique portal interface. In addition to the broadcast content, such a service aggregate can include video-on-demand, such as previous episodes of programs on the Discovery channels.

A service aggregate can include a combination of different types of services, such as a group of related channels (e.g., the Discovery Channel, TLC, Animal Planet, Travel Channel, Discovery Health, etc.) along with on-demand video of particularly related shows (e.g., episode 15 of Kids Health Works). A service aggregate can include episodes (e.g., all the episodes of "Wild Discovery"), or possibly a subset of past episodes of a program. The aggregate may also be based on program characteristics, for example, the most popular shows, the least popular shows, or the newest network programs. Types of services that can be included in the service aggregates include broadcast channels, on-demands programming, targeted advertisements, Web sites, and other types of information, such as, stock tickers, news, sports scores, interactive games, or aggregates containing other content.

Membership in a service aggregate can be based on business affiliations or relationships between parties that are related to the services in the aggregate. These affiliations can include ownership, common ownership, strategic partnership, advertising, or co-marketing.

Services aggregates can include on-demand versions of programs that are broadcast on a particular channel, or on-demand episodes of a broadcast program. The services of an aggregate that are accessible to a viewer may also be based on the time of day. For example, a content provider may restrict access to on-demand content at certain times of the day or the content provider may want to restrict access to previous episodes of a television series according to when the current episode is playing on a broadcast channel.

Services within the service aggregate can be based on other parameters, such as, a content provider promoting a new program by placing an advertisement of the program, a preview of the program, or the program itself within the service aggregate. A service aggregate can also be defined by the genre of the current program or some other attribute or category associated with the current program.

Advertisement services within a service aggregate can be targeted to a particular program. For example, if a particular product can be seen in a program, an advertisement targeted to the product may be entered into the service aggregate. In another example, advertisement services can be targeted to a program, such as a video-on-demand, which is accessed from a service aggregate. Also, if another channel is logically related to the current program being viewed, the related channel may be included in the service aggregate. In still another example, if a program or channel is affiliated with the owner of the currently viewed channel or program, the affiliated channel or program may be entered as a service in the aggregate. Again, by controlling the relationship between the currently viewed material and the services placed within the service aggregate, a viewer's navigating ability is controlled by the creator of the service aggregate. By controlling navigation abilities of a viewer an aggregate creator can target brand name associations with viewers.

3 System Implementation

Figure 4:
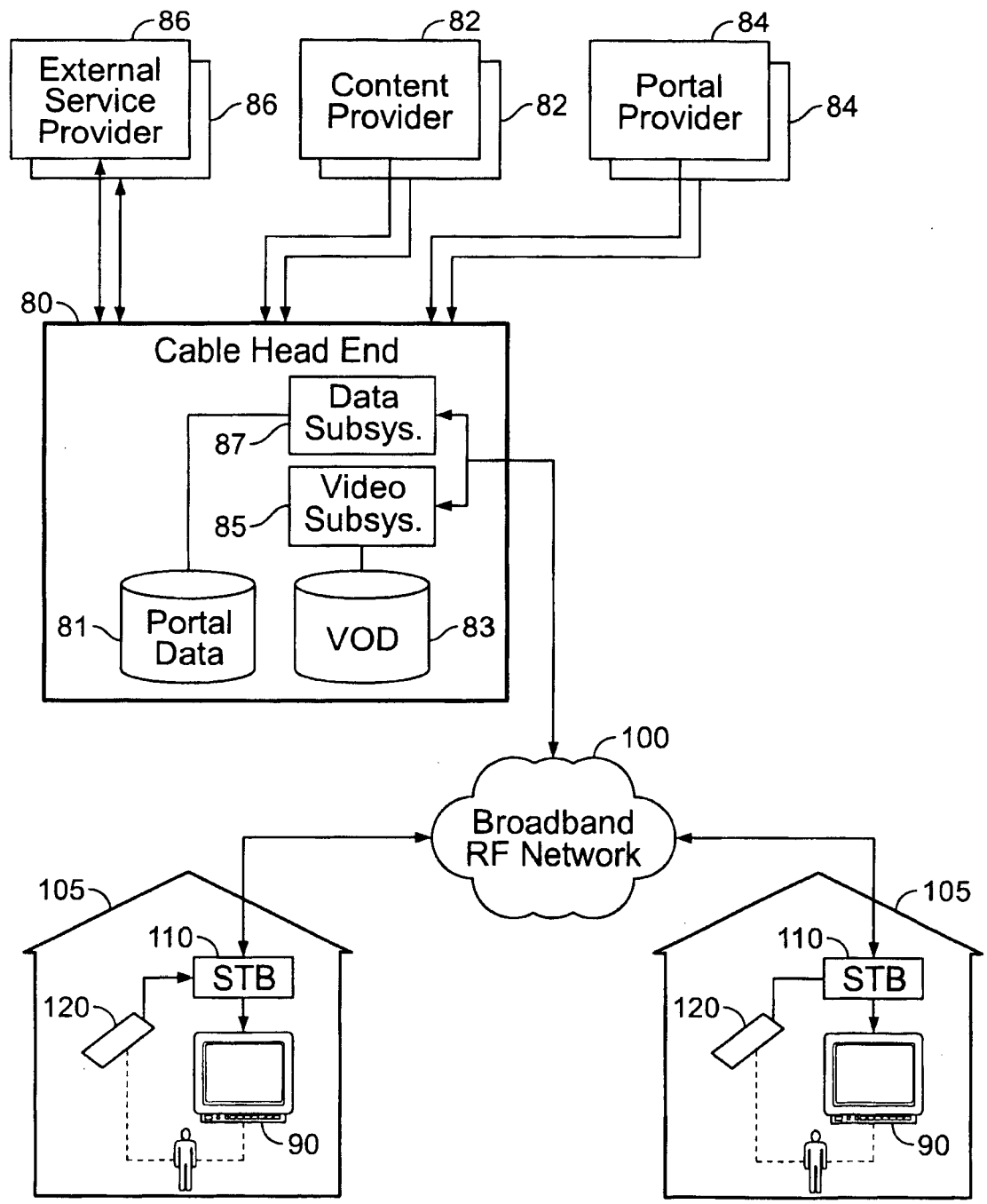
FIG. 4 illustrates a television system.

Referring to FIG. 4, television content as well as information related to the user interfaces for various service aggregates available to viewers of the television system is delivered from a cable head end 80 to viewer premises 105 over a broadband RF network 100. At each of the viewer premises, a "set-top box" (STB) 110 communicates with cable head end 80, and supports functions such as tuning to particular broadcast channels or receiving on-demand programs provided by cable head end 80. STB 110 generates video signals that are displayed on a viewer's television 90, and receives viewer's commands from a remote control 120, or optionally through controls on the STB itself. Television 90 presents both programs as well as graphical interfaces used by the viewer to navigate between different services of the system.

Information that defines the various service aggregates as well as the user interfaces for navigating among the members of those services is passed from cable head end 80 to STB's 110. Each STB includes a programmable processor that executes software that enables the interaction with the viewer when the viewer is using the graphical interface to view a service aggregate.

The information that defines the service aggregates and the user interfaces for those service aggregates comes from a variety of sources. Content providers 82, such as television networks, who may provide a number of different television channels to cable head end 80 can define service aggregates and provide the information for those services to the cable head end along with their content. Each content provider can define a number of different service aggregates, for example, catering to different types of viewers. Portal providers 84, who do not necessarily provide any of the program content that is available to the viewers, can also define service aggregates and provide information to the cable head end 80 for defining those service aggregates and their user interfaces. Some of the services that are grouped to form service aggregates are not necessarily provided by content providers 82 or portal providers 84. For example, access to computer network services, such as access to Internet-based web content, and access to electronic commerce systems can be provided by external service providers 86 that are also linked to cable head end 80.

Figure 5:
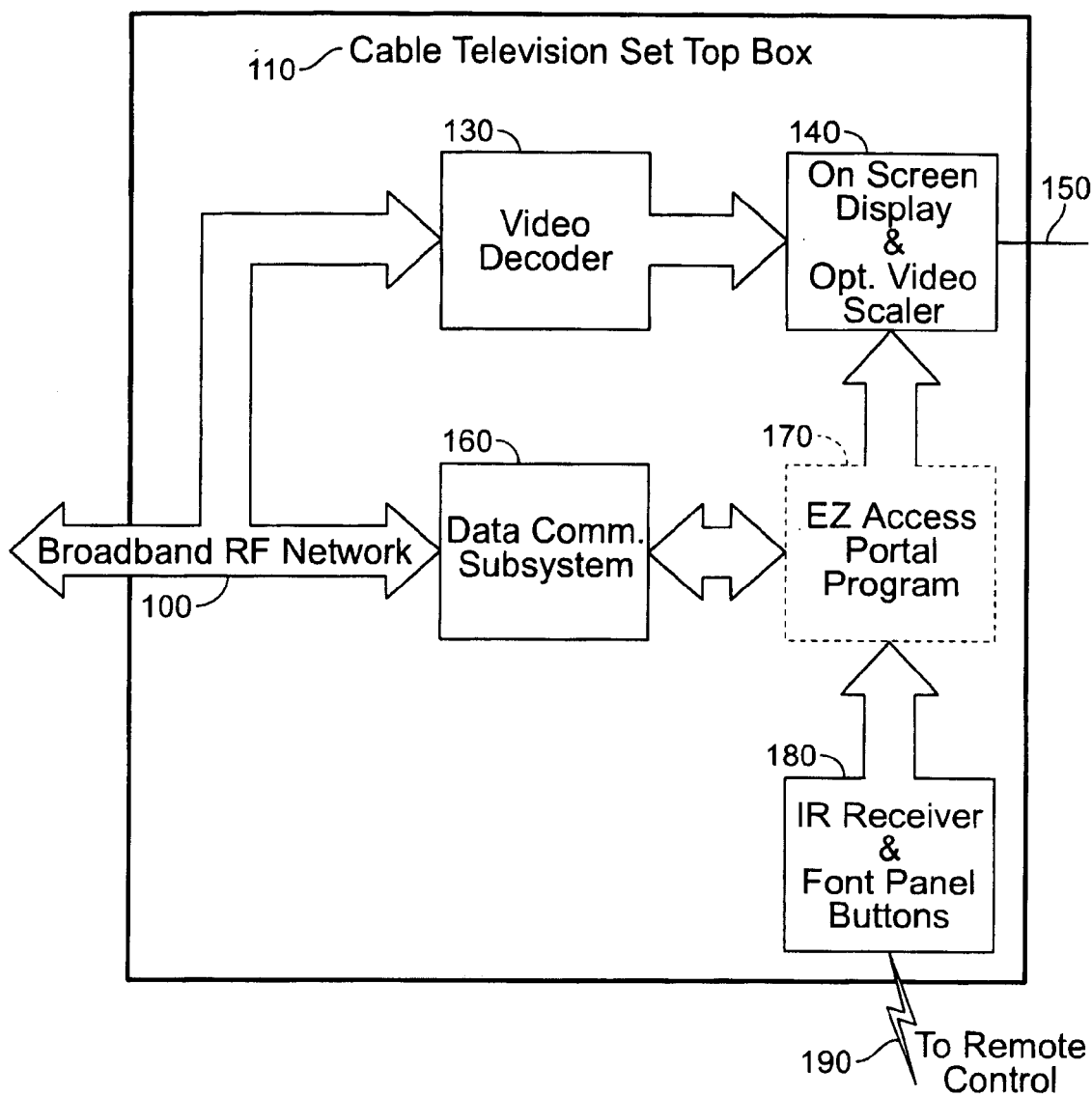
FIG. 5 illustrates an example of a set-top box block diagram.

Referring to FIG. 5, set-top-box 110 includes components for processing programming for display on the viewer's television. A video decoder 130 receives digital or analog television signals from cable head end 80 and generates viewable television signals that are passed to television 90. STB 110 includes an on screen display & optional video scaler (OSD) 140. Video decoder 130 and OSD 140 work together so that programming can be displayed on the user's television unaltered, or optionally, a graphical interface can be displayed on the television, possibly in conjunction with programming. For example, menus can be superimposed on programming, or the programming can be scaled to occupy less than all of the television display and the remaining portion is used for the graphical interface.

Information that defines operation of the user interfaces for various service aggregates is passed as data from a data subsystem 87 at cable head end 80 to a data communication subsystem 160 in STB 110. Alternative communication channels for transmitting the data are described below.

STB 110 includes a portal program 170 that manages the presentation of user interfaces for the service aggregates. Portal program 170 is initially downloaded from cable head end 80 when the STB is powered on. Portal program 170 coexists with other programs that are downloaded to the STB, for example, with a traditional Electronic Program Guide. Alternatively, portal program 170 is not downloaded initially, and is downloaded when the viewer first accesses a service of a service aggregate.

The data for service aggregates that is passed to a STB includes scripts that when executed in the STB display corresponding portal menus. A script that is sent to the STB is interpreted by portal program 170 and results in information being provided to OSD 140 for displaying the images of the user interface on the viewer's television. Under control of the downloaded script, a menu does not necessarily obstruct the underlying video program. Portal program 170 may control OSD 140 to scale the video into a portion of the display area so that the menu does not overlay any portion of the underlying program.

Figure 6:
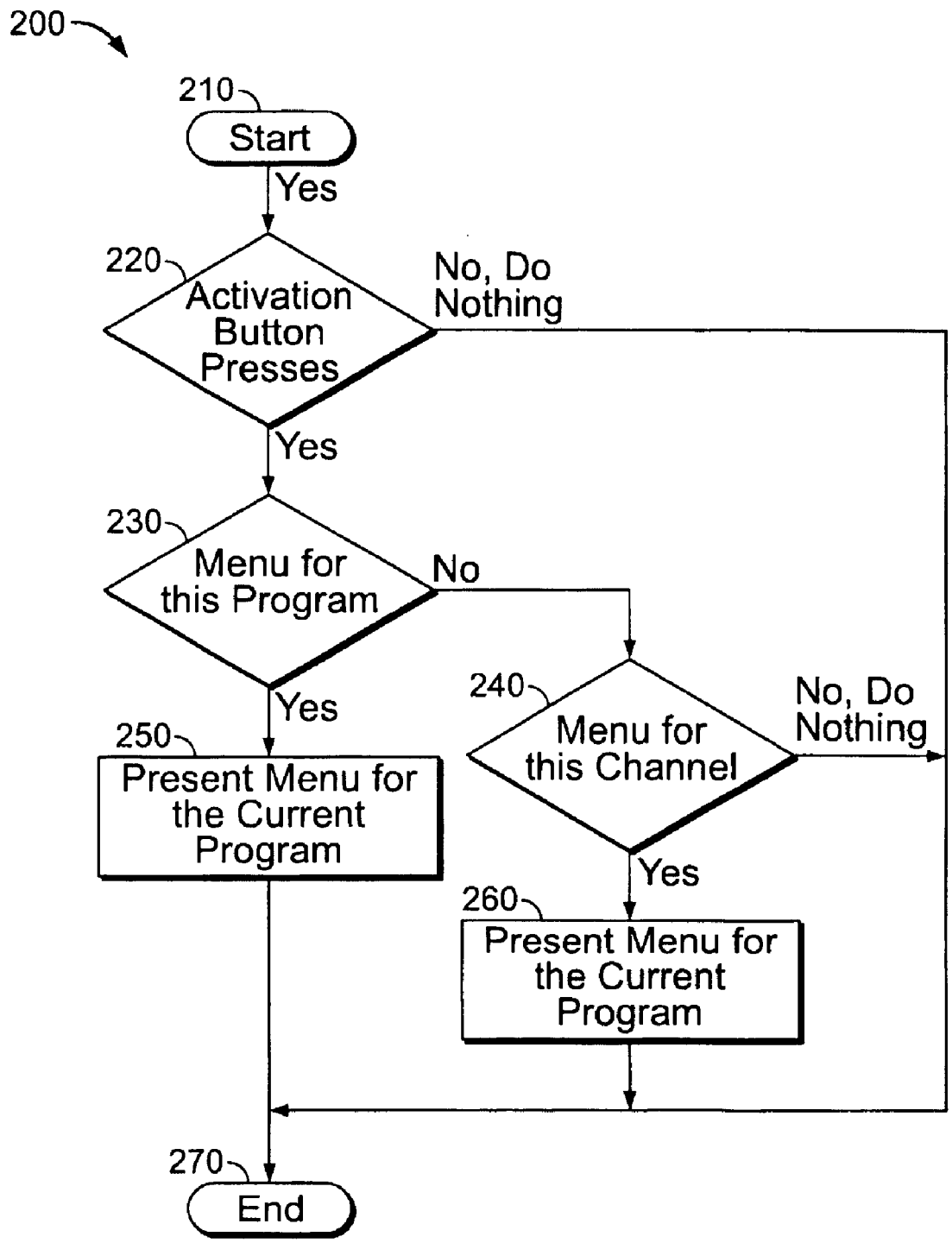
FIG. 6 illustrates a flow chart of a menu activation process.

Referring to FIG. 6, portal program 170 executes a procedure 200 that monitors inputs from the viewer. The procedure first checks whether a command indicating that the viewer has pressed the activation button (step 220) on the infrared remote control 120 (shown in FIG. 4) has been received. For example, the activation button is marked "MENU" on the remote control. When receiving the activation command, the portal program determines if there is a menu script for the program currently viewed (step 230), and if not, if there is a menu script for the television channel being viewed (step 240). If there is a menu script for the current program, or for the current channel, that script is executed by portal program 170 (steps 250, 260). If there is no menu for either the program being viewed or the channel being viewed then no menu for an service aggregate is displayed. Optionally, if there is no menu for an appropriate service aggregate, the command can initialize display of an overall program guide to the viewer.

Figure 9A:
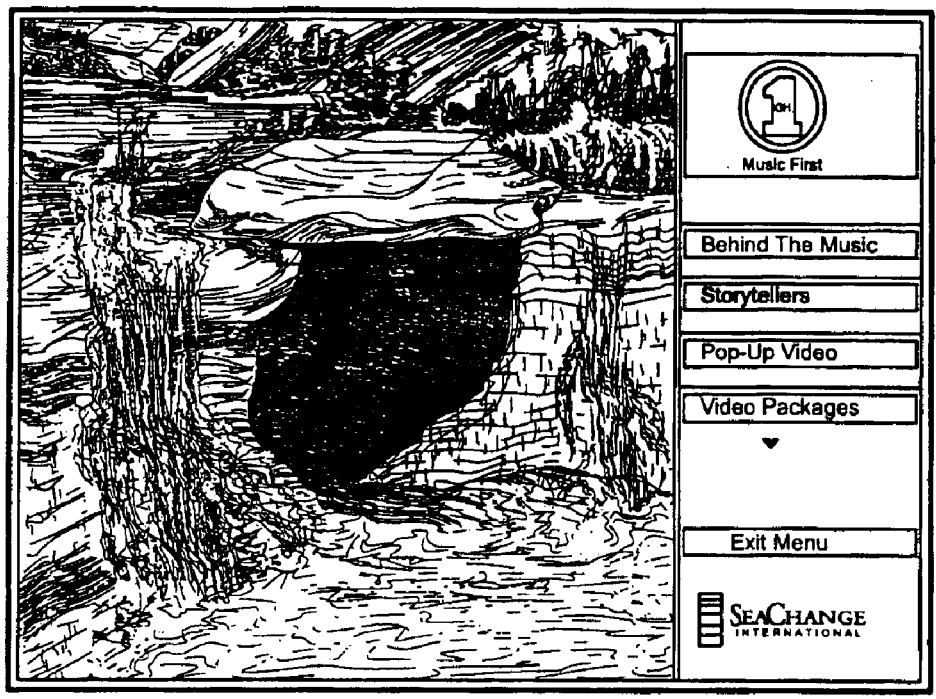
FIGS. 9a and 9b illustrate a view of a video and a menu on a television.
Figure 9B:
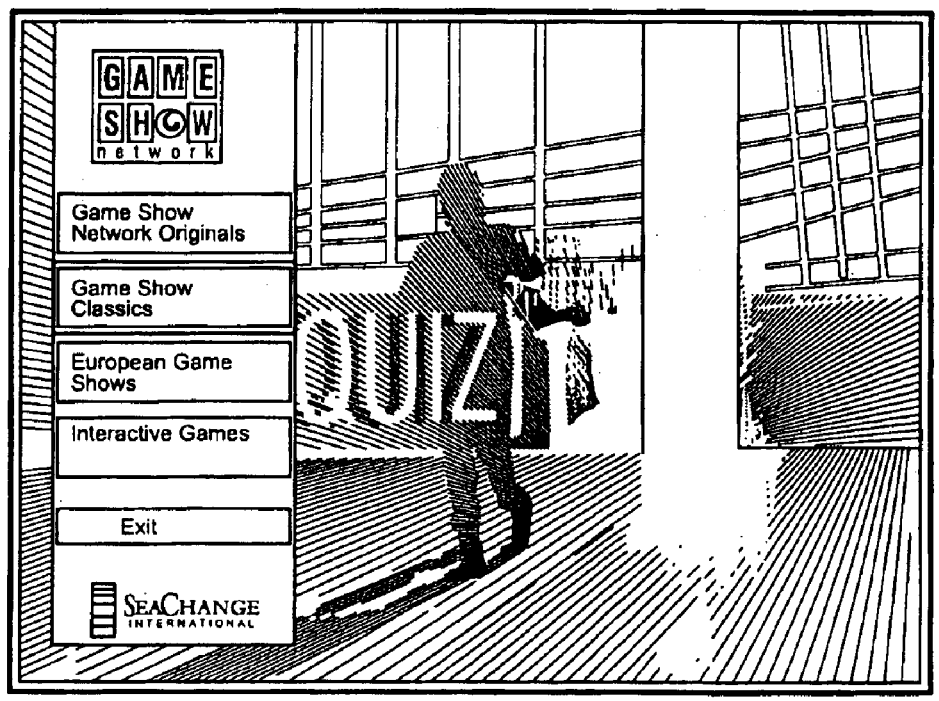
Figure 10A:
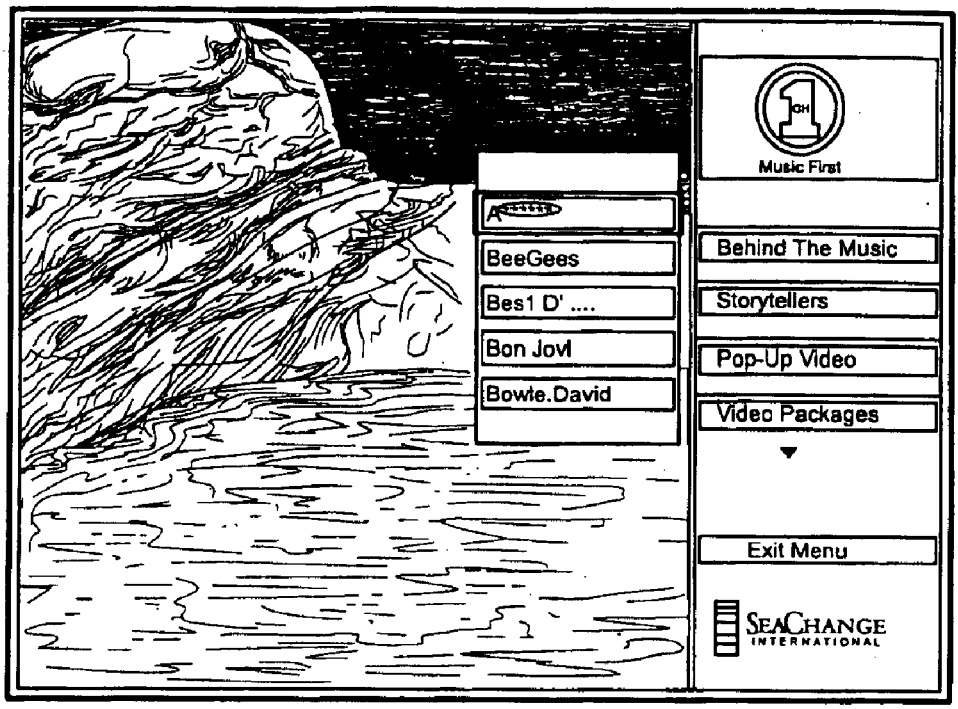
FIGS. 10a and 10b illustrate a view of a video and a menu and submenu on a television.
Figure 10B:
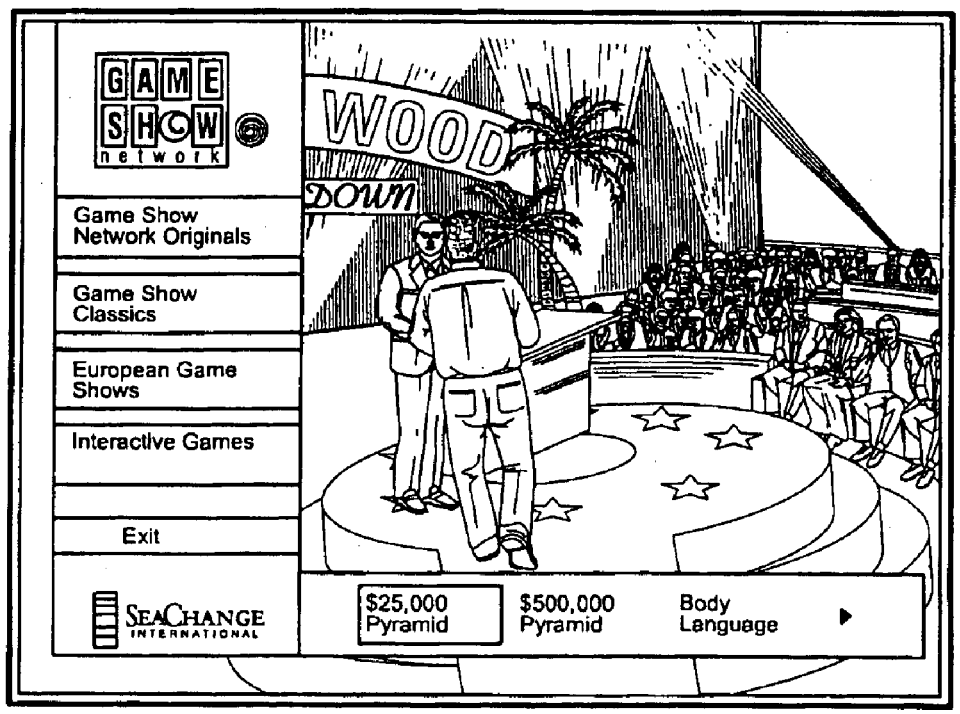
Figure 11A:
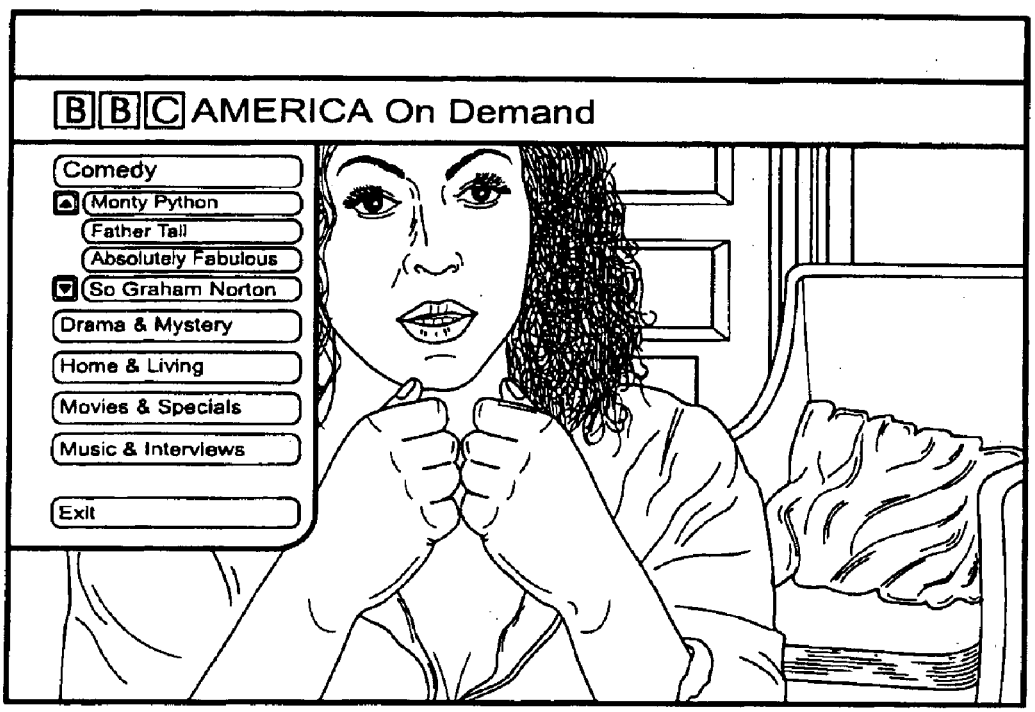
FIGS. 11a and 11b illustrate a view of a video and a menu and submenu on a television.
Figure 11B:
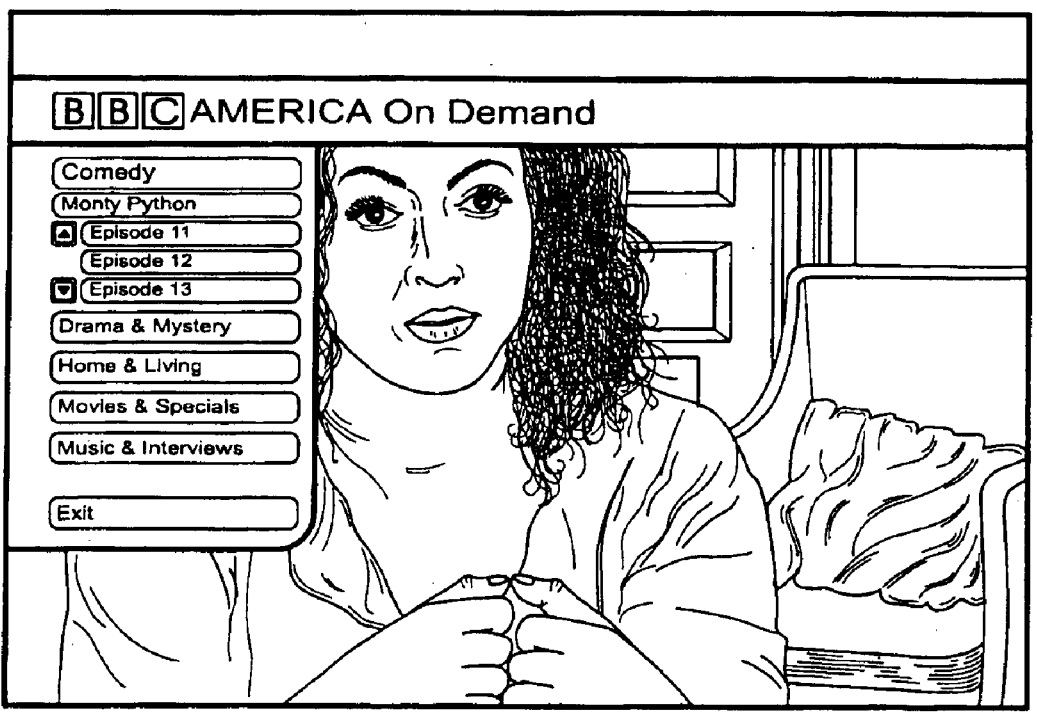

Through execution of a menu script, a menu is displayed by OSD 140 (shown in FIG. 5) concurrently with the program being viewed on the television. The menu may not completely obstruct the underlying video program. Also, the OSD 140 may scale the currently viewed video into a portion of the television screen so that it is not overlaid by the menu. Alternatively, referring to FIGS. 9a and 9b, a menu can overlay a portion of the video image displayed. Referring to FIGS. 10a and 10b, sub-menus, described above, may be variously positioned on the currently viewed images. FIG. 10a, in one example, positions the sub-menu adjacent to the selected menu option. Referring to FIG. 10b, in another example, the sub-menu is placed at the bottom of the television screen and overlays a different portion of the currently viewed video program. Referring to FIGS. 11a and 11b, in another example, the sub-menus can be placed within the primary menu structure which overlays a portion of the currently viewed video program.

Through the control of the menu script, the choices of services presented to the user can vary depending on a number of factors, as can the visual presentation of the services. The factors that affect the interface can include, but are not limited to, a particular scene or time interval within a program, time of day, channel or program being viewed, demographics, and business rules.

Figure 7:
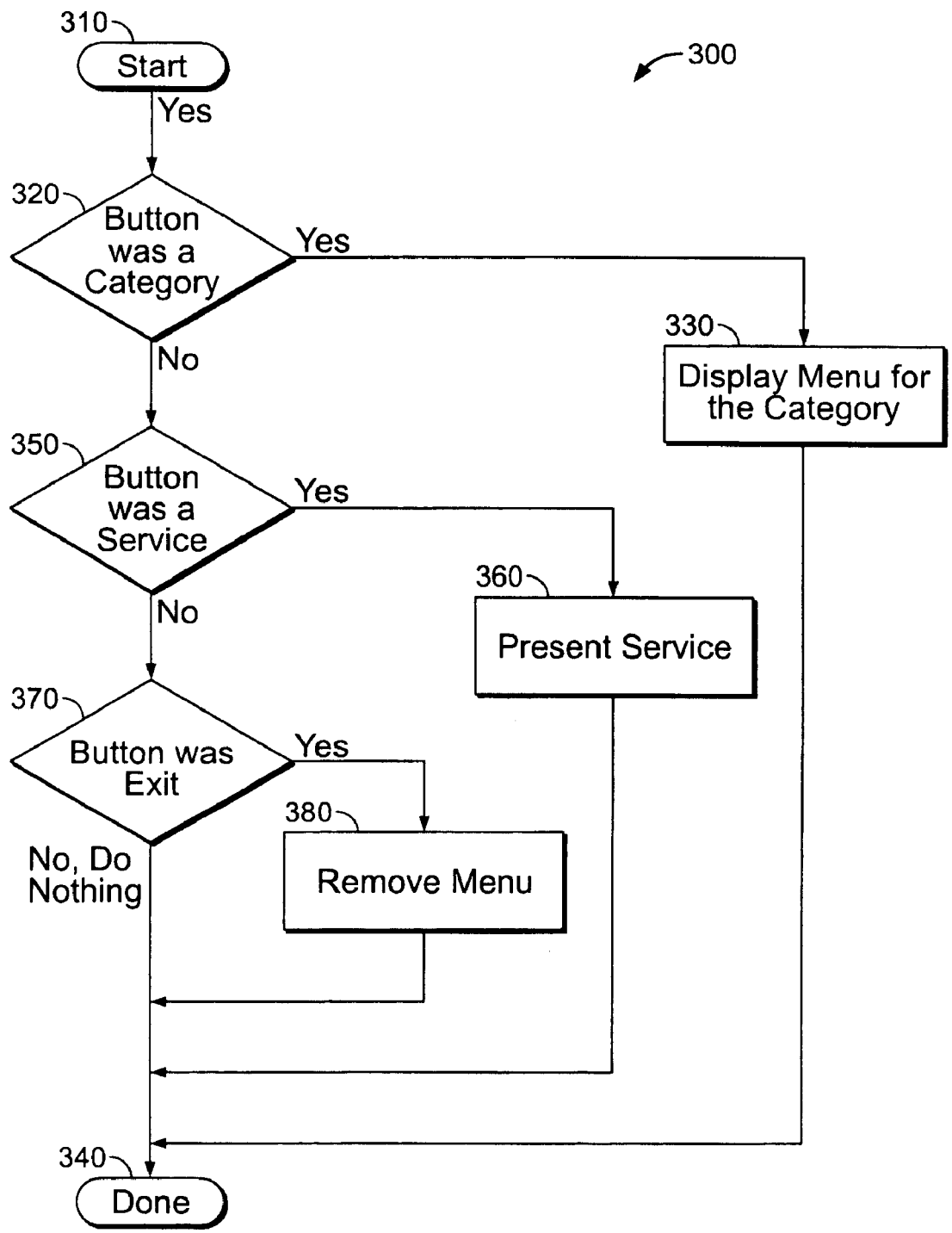
FIG. 7 illustrates a flow chart of a menu selection process.
Figure 8A:
FIGS. 8a and 8b illustrate a view of a video on a television.
Figure 8B:

Referring to FIG. 7, execution of a menu script can control a number of interactions with a user, in which the user enters commands by pressing buttons such as "up" and "down" or numeric buttons. For example, a menu script can implement a procedure 300 that allows the viewer to use remote control 120 to select from the menu options. A viewer's selection can correspond to a category of services (step 320). If a category is selected a category menu is displayed (step 330) on the television screen. If a particular service, such as a broadcast TV channel, on-demand video program, or other similar video content, is selected (step 350), the service is presented (step 360), for example, using standard functions of the STB to access that service. For example, if the selected content is a broadcast program, the script controls the STB to tune to the appropriate channel. For VOD content, the script causes the STB to send commands to the cable head end to provide the on-demand content to the STB for display. In the case of pay-per-view on-demand content, the selection can automatically purchase the content without further interaction with the viewer. If "exit" is selected (step 370), the script is exited and the menu is no longer displayed.

Figure 12A:
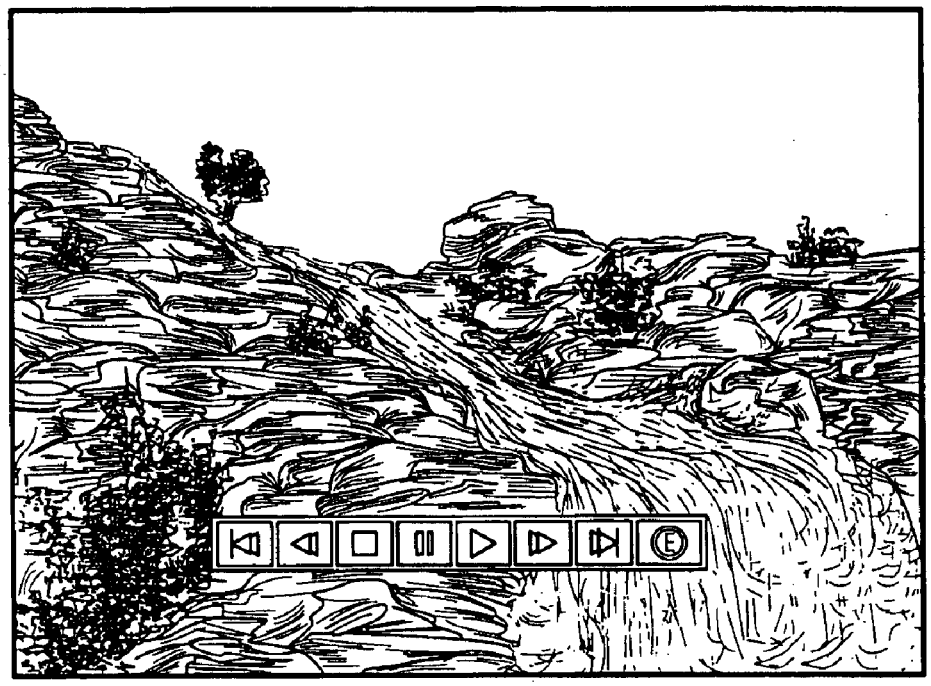
FIGS. 12a and 12b illustrate a view of a video and a video-on-demand control bar on a television.
Figure 12B:
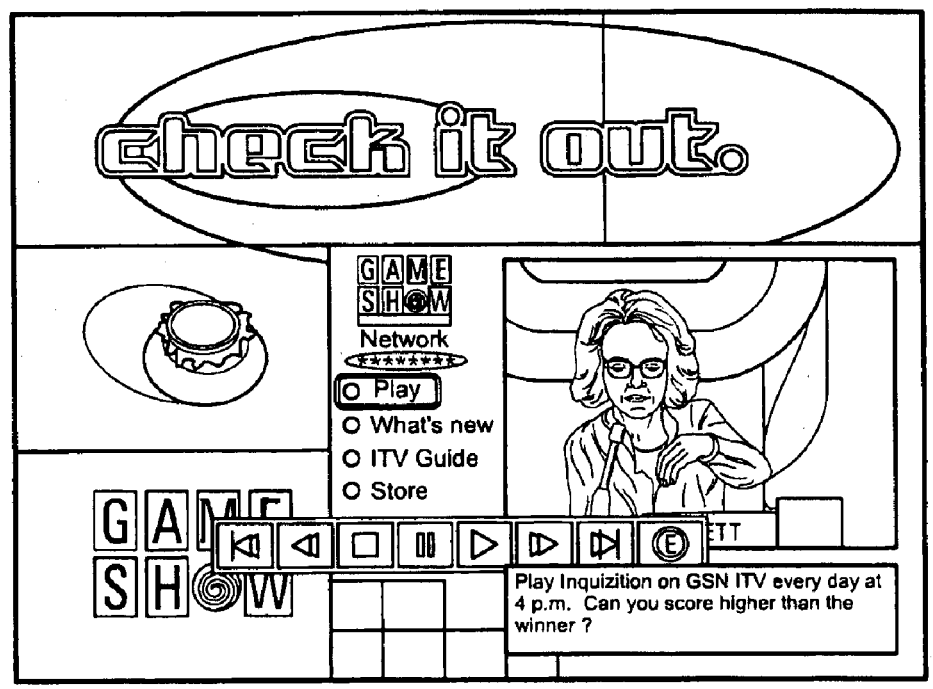

Referring to FIGS. 12a and 12b, a control bar optionally overlays a video when the viewer selects a video-on-demand service. The video viewing can be controlled by the viewer using the control bar. For example, the viewer can terminate viewing the video being displayed and return to the previous video service or to the menu from which the video was selected. In another example, a service aggregate may be displayed while presenting the video.

The scripts are stored in a portal data storage 81 at the head-end 80 and retrieved as they are needed by portal program 170. A variety of mechanisms are available to deliver data to the program running on a set-top box. Two-way communication systems can be used to retrieve menu scripts as they are needed. On-demand delivery of menu scripts can use DOCSIS cable modems, telephone modems, and set-top box manufacturer propriety two-way RF communication systems. For Motorola DCT2000 series set-top boxes a two-way UDP/IP based transport can be used by the set-top box to request and accept delivery of the menu scripts. For the Scientific/Atlanta Explorer 3000 set-top boxes a TCP/IP based transport can be used.

In alternative versions of the system, the menu scripts that are processed by the portal program are "broadcast" out-of-band separately from the program content from head end 80 to the STBs and stored in the STB until they are accessed by portal program 170. Various broadcast channels are available in cable systems, including propriety RF communication systems. Once the portal program has received the menu data, it can cache the data for subsequent use.

Broadcast alternatives also include in-band delivery of menu information along with the program content. For example, in-band MPEG-2 transport stream can be used to deliver information for the service aggregate. The transport stream is used to deliver both a digital video program and its associated menu information. The benefits of the delivery mechanism include an implicit binding of video program and menu data, a high-bandwidth push data delivery mechanism, faster display of menus, and no upstream communications traffic. Because the menu data is pushed to the set-top box, no upstream traffic is necessary to request the delivery of the menu data. With in-band data delivery, the STB application begins buffering the menu data as soon as the channel is tuned.

In-band data can be added to transport streams at a video subsystem 85 at head end 80, or can be provided by content providers as part of the programming delivered to head end 80.

Referring to FIG. 13*a–c*, three examples of menu scripts are shown, which after down-loaded from the cable head end 80 (FIG. 4) and executed allow a viewer to navigate within a number of different service aggregates.

4 Alternatives

Besides activating a service aggregate menu by selecting a television channel, the service aggregate may be activated by a "menu" button on the user's remote control. By pressing one remote control button, a menu may overlay the currently viewed program. Similarly a remote control button may remove the service aggregate menu from the television screen. A service aggregate menu may also be selected from a EPG or other similar program guide.

A number of embodiments of the invention have been described. Nevertheless, it will be understood that various modifications may be made without departing from the spirit and scope of the invention. For example, a viewer demographics may be used to relate a service aggregate to a currently viewed program or channel. Accordingly, other embodiments are within the scope of the following claims.

What is claimed is:

1. A method for providing access to television content comprising at a service provider:

sending a first video content program over a first channel, the first video content program or the first channel being provided by a content provider from among a plurality of content providers;

receiving a request from a viewer watching the first video content program over the first channel;

in response to the request, presenting a viewer-activated interface that includes a selection menu which provides the viewer with selective access to a limited group of alternative video content programs or channels, including one or more video-on-demand programs, the limited group of alternative video content programs or channels available for selection at any time from the selection menu being dependent on the first video content program or the first channel being watched by the viewer and substantially limited to video content programs or channels available from a predetermined group of one or more affiliated content providers of which the content provider that provides the first video content program or the first channel is a member;

enabling the viewer to interactively select a second video content program or a second channel from the limited group of alternative video content programs or channels; and presenting the selected second video content program or the second channel to the viewer.

2. The method of claim 1 wherein the first video content program includes a video content program that belongs to a group consisting of a television broadcast and a video-on-demand program.

3. The method of claim 1 wherein the group of alternative programs or channels includes a video content program that belongs to a group consisting of a television broadcast, a video-on-demand program, an advertisement, a subscription program, a subscription-on-demand program, and a group of items of video content.

4. The method of claim 1 wherein the content provider comprises a television network.

5. The method of claim 1 wherein the service provider comprises a television system operator.

6. The method of claim 5 wherein the service provider comprises a cable television system operator.

7. The method of claim 1 further comprises sending the first video content program over the first channel to a terminal associated with the viewer.

8. The method of claim 7 wherein the terminal associated with the viewer is a set-top box.

9. The method of claim 1 further comprises sending information that defines the group of alternative video content programs or channels associated with the first video content program or the first channel being watched by the viewer.

10. The method of claim 9 further comprising accepting the information that defines the group of alternative video content programs or channels from content providers.

11. The method of claim 9 further comprising accepting the information that defines the group of alternative video content programs or channels from a portal provider.

12. The method of claim 11 wherein the portal provider does not provide video content programs or channels to the service provider.

13. The method of claim 9 further comprising determining the information that defines the group of alternative video content programs or channels by the service provider.

14. The method of claim 9 wherein sending the information that defines the group of alternative video content programs or channels includes sending instructions for execution at a terminal associated with the viewer.

15. The method of claim 9 wherein sending the first video content program comprises:

sending the first video content program over the first channel to a terminal associated with the viewer, and sending information that defines the group of alternative video content programs or channels associated with the first video content program or the first channel to the terminal associated with the viewer.

16. The method of claim 9 wherein sending information that defines the group of alternative video content programs or channels associated with the first video content program or the first channel comprises sending the information in conjunction with the first video content program.

17. The method of claim 16 wherein sending the information in conjunction with the first video content program comprises sending the information that defines the group of alternative video content programs or channels in-band with a transport stream used to send the first video content program.

18. The method of claim 16 wherein sending the information in conjunction with the first video content program comprises sending the information out-of-band separately from the first video content program.

19. The method of claim 18 wherein sending the information out-of-band separately from the first video content program comprises sending the information using a data packet transport protocol.

20. The method of claim 1 wherein presenting the viewer-activated interface further comprises enabling the viewer to make the request by pressing a single button on a remote control.

21. The method of claim 1 further comprising presenting the viewer-activated interface to provide the viewer with access to a group of alternative video content programs or channels that are further based on a time interval within the first video content program.

22. The method of claim 1 further comprising presenting the viewer-activated interface to provide the viewer with access to a group of alternative video content programs or channels that are further based on viewer characteristics.

23. The method of claim 22 wherein the viewer characteristics include demographic information associated with the viewer.

24. A method for providing access to television content comprising, at a service provider:

sending a first video content program over a first channel, the first video content program or the first channel being provided by a content provider from among a plurality of content providers;

accepting a request from a viewer watching the first video content program over the first channel;

in response to the request, presenting a viewer-activated interface that includes a selection menu which provides the viewer with selective access to a limited group of alternative video content programs or channels, including one or more video-on-demand programs, the limited group of alternative video content programs or channels available for selection at any time from the selection menu being dependent on the first video content program or the first channel being watched by the viewer and substantially limited to video content programs or channels available from a predetermined group of one or more affiliated content providers of which the content provider that provides the first video content program or the first channel is a member;

accepting a selection from the viewer of a second video content program or a second channel from the limited group of alternative video content programs or channels; and presenting the selected second video content program or the second channel to the viewer.

25. A video delivery system comprising:

means for sending a first video content program over a first channel, the first video content program or the first channel being provided by a content provider from among a plurality of content providers;

means for receiving a request from a viewer watching the first video content program over the first channel;

means for presenting a viewer-activated interface that includes a selection menu which provides the viewer with selective access to a limited group of alternative video content programs or channels, including one or more video-on-demand programs, the limited group of alternative video content programs or channels available for selection at any time from the selection menu being dependent on the first video content program or the first channel being watched by the viewer and substantially limited to video content programs or channels available from a predetermined group of one or more affiliated content providers of which the content provider that provides the first video content program or the first channel is a member;

means for enabling the viewer to interactively select a second video content program or a second channel from the limited group of alternative video content programs or channels; and means for presenting the selected second video content program or the second channel to the viewer.

26. A video delivery system comprising:

a service provider; and a plurality of terminals coupled to the service provider, each configured to receive video content programs over one or more channels from the service provider;

wherein the video delivery system is configured to present a viewer-activated interface that includes a selection menu which provides the viewer with selective access to a limited group of alternative video content programs or channels, including one or more video-on-demand programs, the limited group of alternative video content programs or channels available for selection at any time from the selection menu being dependent on a first video content program presented over a first channel to a first of the terminals and substantially limited to video content programs or channels available from a predetermined group of one or more affiliated content providers of which the content provider that provides the first video content program or the first channel is a member;

the video delivery system being further configured to enable the viewer to interactively select a second video content program or a second channel from the limited group of alternative video content programs or channels.

27. The video delivery system of claim 26 wherein the terminals are configured to receive information that defines the group of alternative video content programs associated with the first video content program or the first channel.

28. The video delivery system of claim 24 wherein the terminals are further configured to execute instructions that define the group of alternative video content programs associated with the first video content program or the first channel.

* * * * *